(12) United States Patent
Moorman

(10) Patent No.: US 8,500,600 B2
(45) Date of Patent: Aug. 6, 2013

(54) HYDRAULIC CONTROL SYSTEM FOR AN AUTOMATIC TRANSMISSION HAVING A MANUAL VALVE WITH A TWO GEAR DEFAULT STRATEGY

(75) Inventor: Steven P. Moorman, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 390 days.

(21) Appl. No.: 12/987,715

(22) Filed: Jan. 10, 2011

(65) Prior Publication Data

US 2012/0175210 A1 Jul. 12, 2012

(51) Int. Cl.
*F16H 61/26* (2006.01)

(52) U.S. Cl.
USPC .......................................................... 477/130

(58) Field of Classification Search
USPC .................. 477/164, 130, 143, 156, 127, 128
See application file for complete search history.

(56) References Cited

U.S. PATENT DOCUMENTS

| | | | |
|---|---|---|---|
| 4,653,352 A | 3/1987 | Nakao et al. | |
| 4,944,202 A | 7/1990 | Gierer | |
| 5,203,235 A * | 4/1993 | Iizuka | 477/94 |
| 5,441,459 A | 8/1995 | Inukai et al. | |
| 5,507,706 A * | 4/1996 | Jang et al. | 477/130 |
| 5,582,559 A * | 12/1996 | Jang et al. | 477/130 |
| 5,626,533 A * | 5/1997 | Jang | 475/129 |
| 5,733,221 A * | 3/1998 | Jang | 477/127 |
| 5,813,941 A * | 9/1998 | Jang | 477/116 |
| 5,876,303 A * | 3/1999 | Yu | 477/116 |
| 5,921,888 A * | 7/1999 | Park | 477/131 |
| 6,027,427 A * | 2/2000 | Yoo | 477/130 |
| 6,537,180 B2 * | 3/2003 | Kim et al. | 477/130 |
| 6,715,597 B1 | 4/2004 | Buchanan et al. | |
| 6,942,591 B2 * | 9/2005 | Park | 475/127 |
| 7,300,375 B2 | 11/2007 | Petrzik | |
| 7,487,866 B2 | 2/2009 | Kruse et al. | |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 | 4/2003 | Alfredsson | |
| 2004/0038765 A1 | 2/2004 | Fujimine et al. | |
| 2007/0175726 A1 | 8/2007 | Combes et al. | |
| 2008/0207392 A1 | 8/2008 | Staudinger et al. | |
| 2008/0210032 A1 | 9/2008 | Uberti et al. | |
| 2009/0151495 A1 | 6/2009 | Garabello et al. | |
| 2009/0157271 A1 | 6/2009 | Garabello et al. | |

FOREIGN PATENT DOCUMENTS

| | | |
|---|---|---|
| DE | 2141564 A1 | 2/1973 |
| DE | 4117736 C1 | 5/1992 |
| DE | 4320353 A1 | 1/1994 |

(Continued)

*Primary Examiner* — David D Le
*Assistant Examiner* — David J Hlavka

(57) ABSTRACT

A hydraulic control system for a transmission includes a source of pressurized hydraulic fluid, a manual valve, and a default valve. A first set of solenoids are configured to selectively engage at least one of a plurality of shift actuators. The first set of solenoids is open when de-energized. A second set of solenoids is configured to selectively engage at least one of the plurality of actuators. The second set of solenoids is closed when de-energized. A low speed default gear is engaged when the first and second sets of solenoids are de-energized and the transmission is operating in a low speed gear ratio. A high speed default gear ratio is engaged when the first and second sets of solenoids are de-energized and the transmission is operating in a high speed gear ratio.

24 Claims, 18 Drawing Sheets

FOREIGN PATENT DOCUMENTS

| | | | |
|---|---|---|---|
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| EP | 0477564 A2 | 4/1992 |
| EP | 1469235 A1 | 10/2004 |
| EP | 1519082 A1 | 3/2005 |
| EP | 1645786 A2 | 4/2006 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2009037170 A1 | 3/2009 |
| WO | WO2010028745 A2 | 3/2010 |

\* cited by examiner

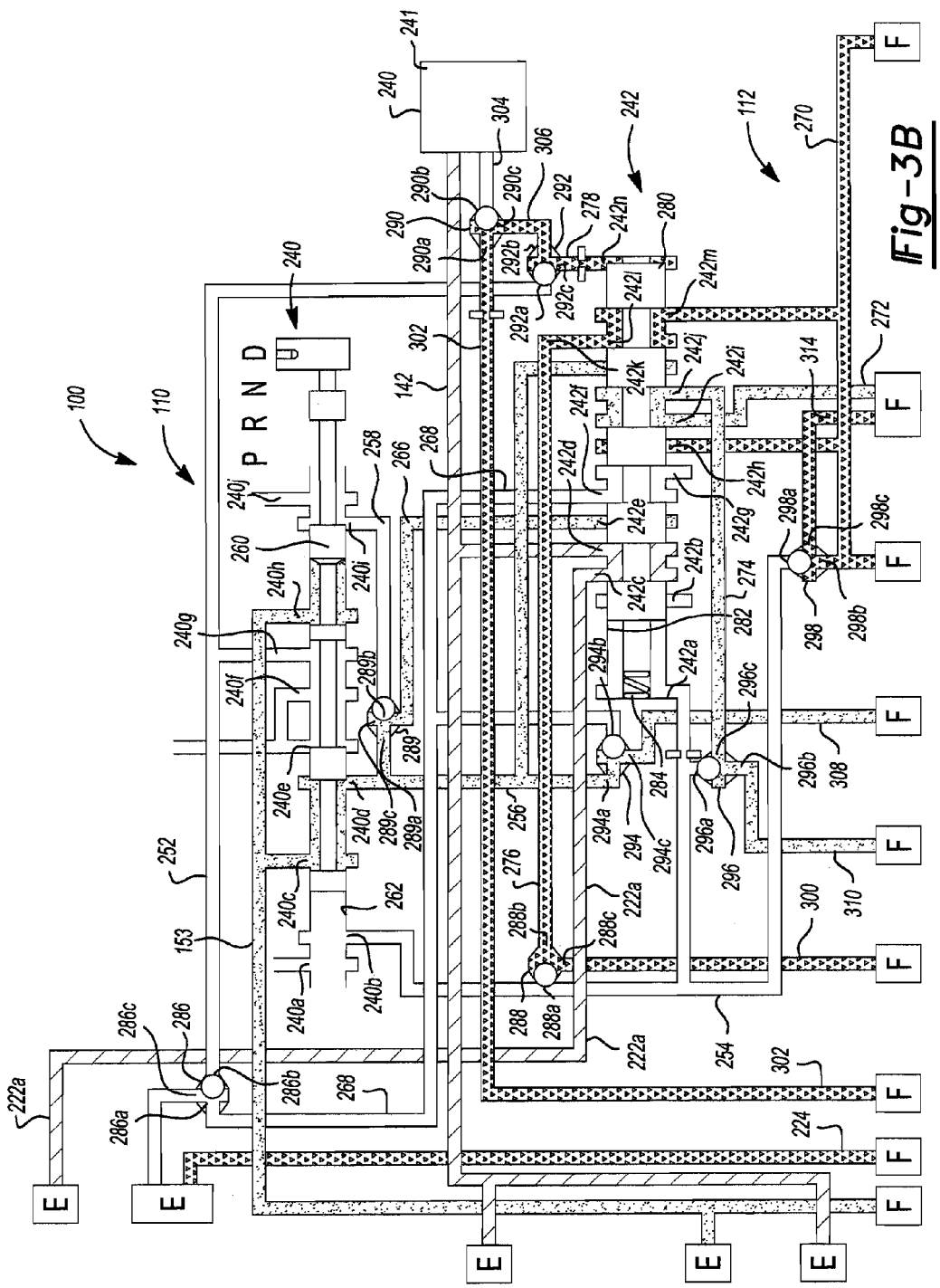

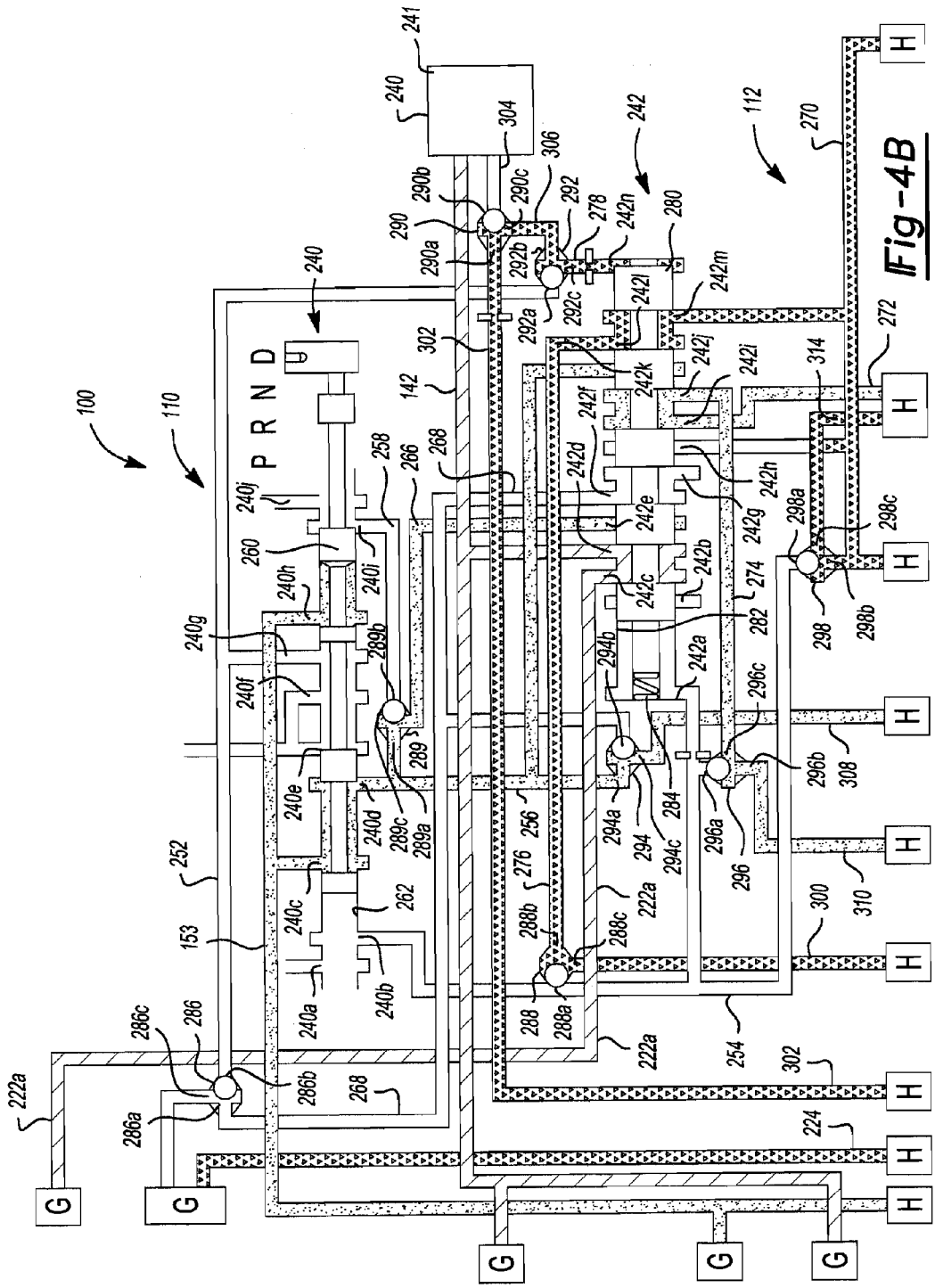

HYDRAULIC CONTROL SYSTEM FOR AN AUTOMATIC TRANSMISSION HAVING A MANUAL VALVE WITH A TWO GEAR DEFAULT STRATEGY

TECHNICAL FIELD

The invention relates to a control system for an automatic transmission, and more particularly to an electro-hydraulic control system having a manual valve and a two gear default strategy.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A hydraulic control system for a transmission is provided. The transmission includes a plurality of torque transmitting devices selectively actuatable by a plurality of actuators for providing at least a set of low speed gear ratios and a set of high speed gear ratios. The hydraulic control system includes a source of pressurized hydraulic fluid, a manual valve moveable between at least a Park position and a Drive position where the manual valve in downstream fluid communication with the source of pressurized hydraulic fluid, and a default valve moveable between a first position and a second position, the default valve in downstream fluid communication with the manual valve. A first set of solenoids are configured to selectively engage at least one of the plurality of actuators. The first set of solenoids is open when de-energized and includes a first subset of solenoids in downstream fluid communication with the source of pressurized hydraulic fluid through the manual valve when the manual valve is in the Drive position and a second subset of solenoids in downstream fluid communication with the default valve. At least the second subset of solenoids is configured to engage each of the plurality of high speed gear ratios and is in downstream fluid communication with the source of pressurized hydraulic fluid through the manual valve and the default valve when the manual valve is in the Drive position and the default valve is in the second position. A second set of solenoids is in downstream fluid communication with the source of pressurized hydraulic fluid and is configured to selectively engage at least one of the plurality of actuators. The second set of solenoids is closed when de-energized and includes a third subset of solenoids each having an inlet in downstream fluid communication with the source of pressurized hydraulic fluid, an outlet in fluid communication with at least one of the plurality of actuators, and an exhaust in fluid communication with the outlet when the third subset of solenoids is closed. The exhaust is in fluid communication with the first set of solenoids through the default valve when the default valve is in the first position. A default gear ratio within the low speed gear ratios is engaged when the manual valve is in the Drive position, the default valve is in the first position, and the first and second sets of solenoids are de-energized. A default gear ratio within the high speed gear ratios is engaged when the manual valve is in the Drive position, the default valve is in the second position, and the first and second set of solenoids are de-energized.

In another aspect of the present invention, a valve solenoid is in fluid communication with the default valve and is operable to move the default valve to the second position, wherein the valve solenoid is closed when de-energized.

In yet another aspect of the present invention, the default valve is kept in the second position by hydraulic fluid provided by the second subset of solenoids when the valve solenoid, the first set of solenoids, and the second set of solenoids are de-energized.

In yet another aspect of the present invention, the first subset of solenoids includes two solenoids and the second subset of solenoids includes one solenoid.

In yet another aspect of the present invention, the second set of solenoids includes three solenoids and the third subset of solenoids includes two solenoids.

In yet another aspect of the present invention, a torque converter clutch solenoid is configured to selectively actuate a torque converter clutch actuator.

In yet another aspect of the present invention, the torque converter clutch solenoid is in downstream fluid communication with the source of pressurized hydraulic fluid through the default valve and the manual valve when the manual valve is in the Drive position and the default valve is in the second position.

In yet another aspect of the present invention, a torque converter control valve is in downstream fluid communication with the source of pressurized hydraulic fluid, a cooler subsystem is in downstream fluid communication with the torque converter control valve, and a lubrication control valve is in downstream fluid communication with the cooler subsystem and in fluid communication with a plurality of actuators that are controlled by the first set of solenoids, and wherein the cooler subsystem includes a cooler and a bypass line that bypasses the cooler.

In yet another aspect of the present invention, when the manual valve is in the Park position and the default valve is in the first position, the torque converter control valve communicates hydraulic fluid to a torque converter from the source of pressurized hydraulic fluid and the torque converter communicates the hydraulic fluid to the cooler subsystem through the torque converter control valve.

In yet another aspect of the present invention, when the manual valve is in the Park position and the default valve is in the second position, the torque converter control valve communicates hydraulic fluid to a torque converter from the source of pressurized hydraulic fluid and the default valve communicates hydraulic fluid to the first subset of solenoids to actuate the actuators, thereby forcing hydraulic fluid through the lubrication valve, through the bypass line, and through the torque converter control valve into the torque converter to help with torque converter turbine stall.

In yet another aspect of the present invention, the high speed gear ratios are engageable when the default valve is in the second position.

In yet another aspect of the present invention, the low speed gear ratios include a first gear, a second gear, and a third gear, and the default gear ratio within the low speed gear ratios is the third gear.

In yet another aspect of the present invention, the high speed gear ratios include a fourth gear, a fifth gear, a sixth gear, a seventh gear, and an eighth gear, and the default gear ratio within the low speed gear ratios is the sixth gear.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

FIGS. 3A-3C is a diagram of a hydraulic control system according to the principles of the present invention in a Drive First Low Speed state of operation;

FIGS. 4A-4C is a diagram of a hydraulic control system according to the principles of the present invention in a Drive Third Gear Default state of operation;

DESCRIPTION

Figure 1A:
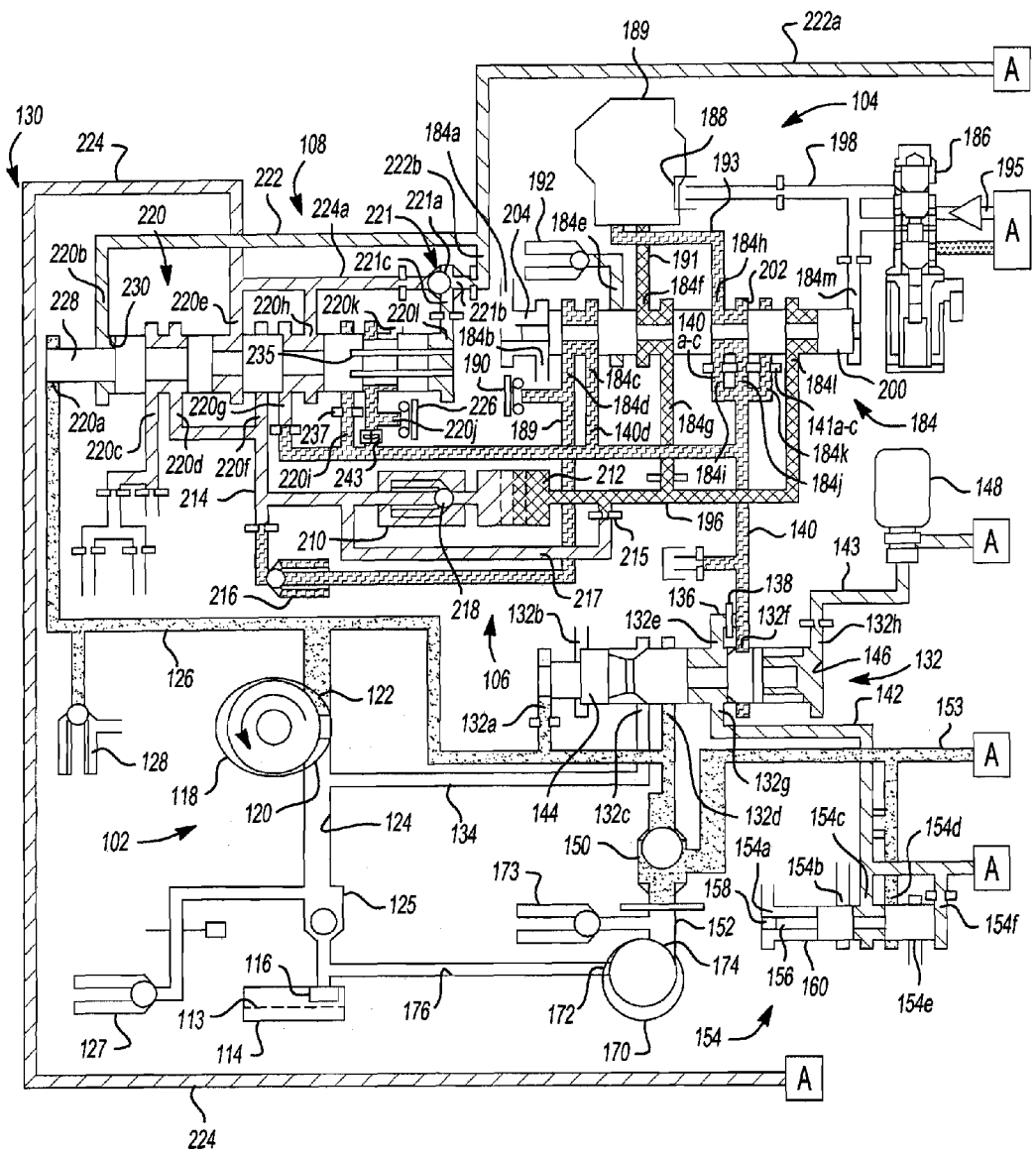
FIGS. 1A-1C is a diagram of a hydraulic control system according to the principles of the present invention in a Park state of operation.
Figure 1B:
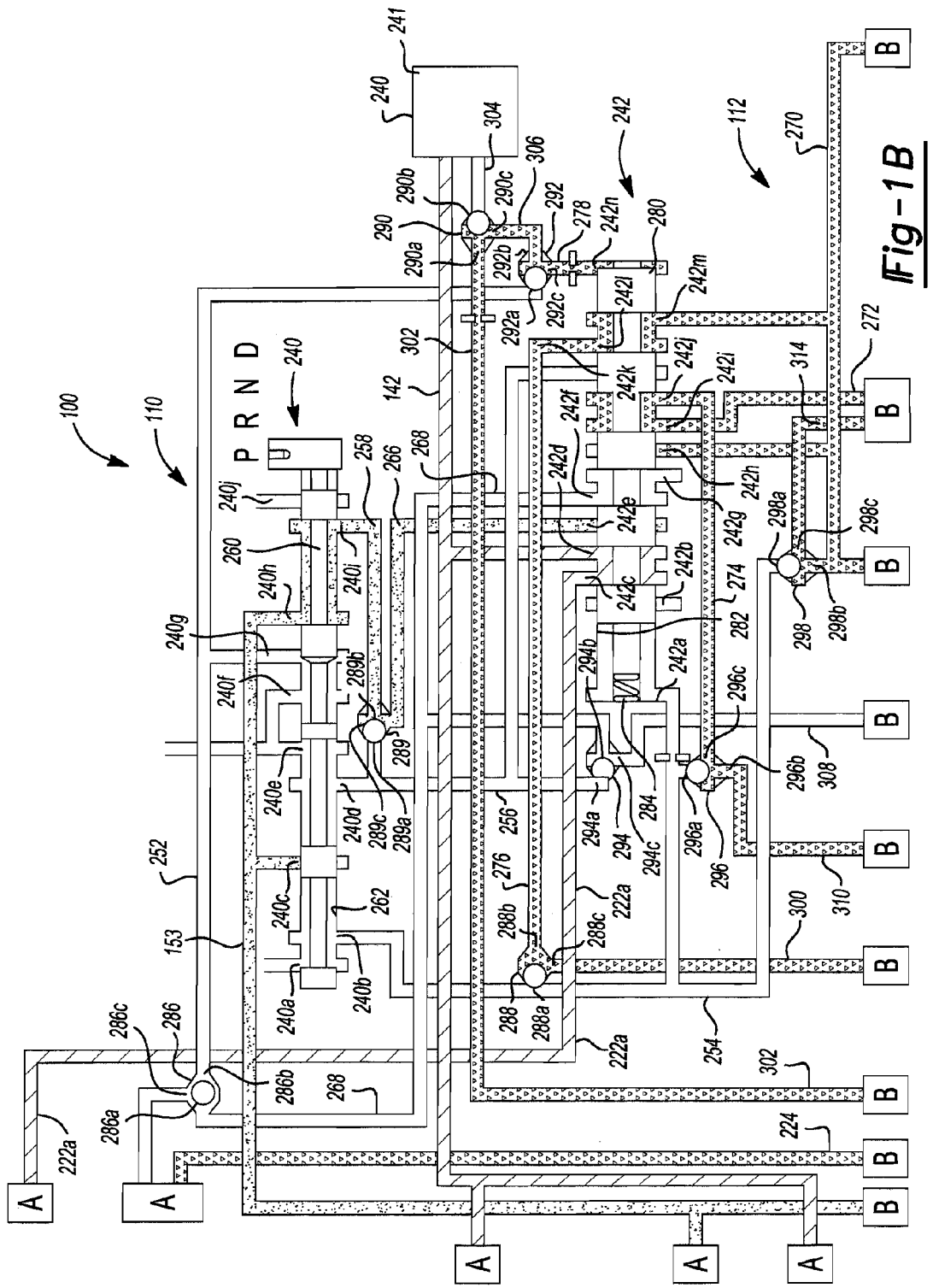
Figure 1C:
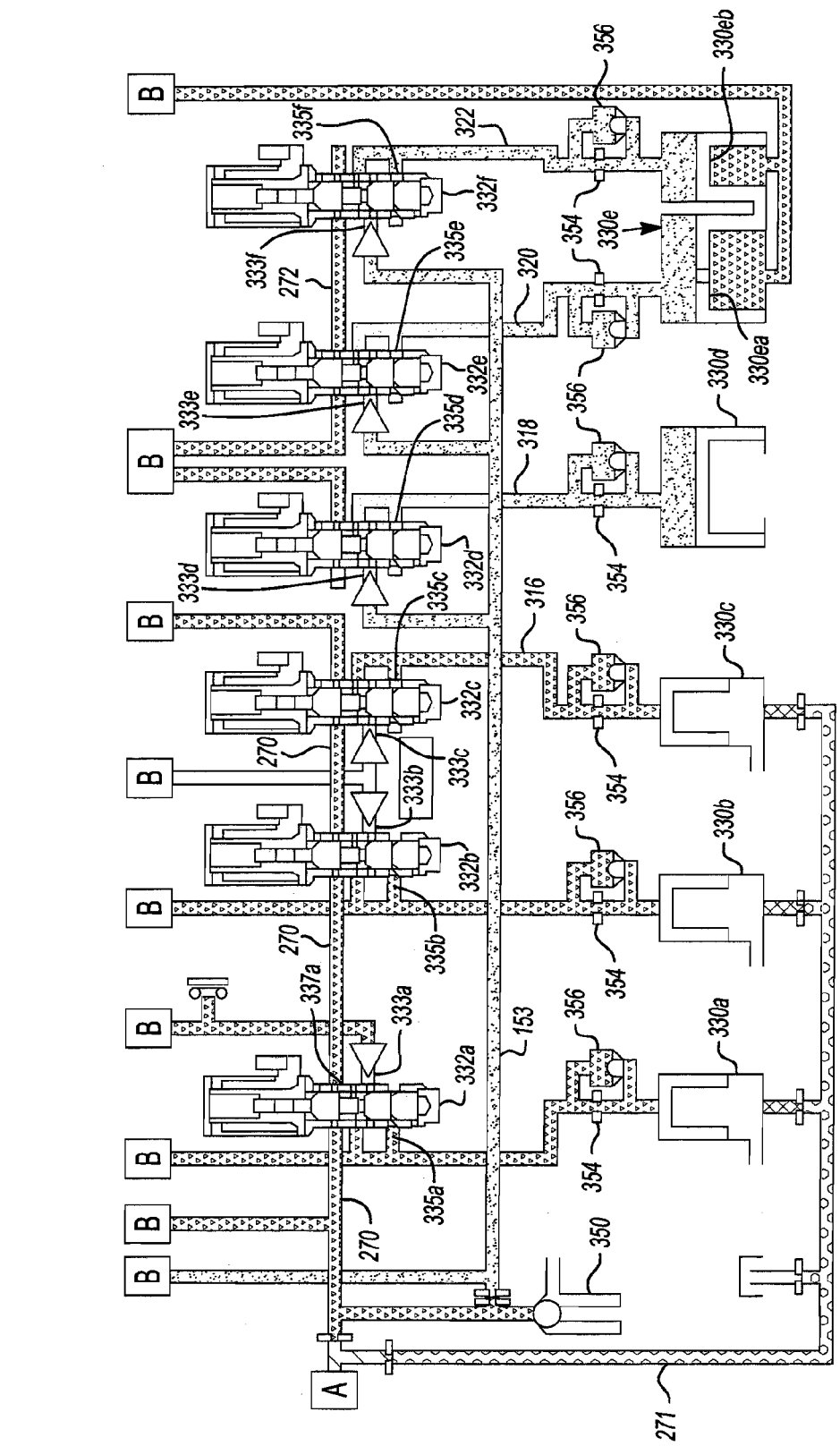
Figure 2A:
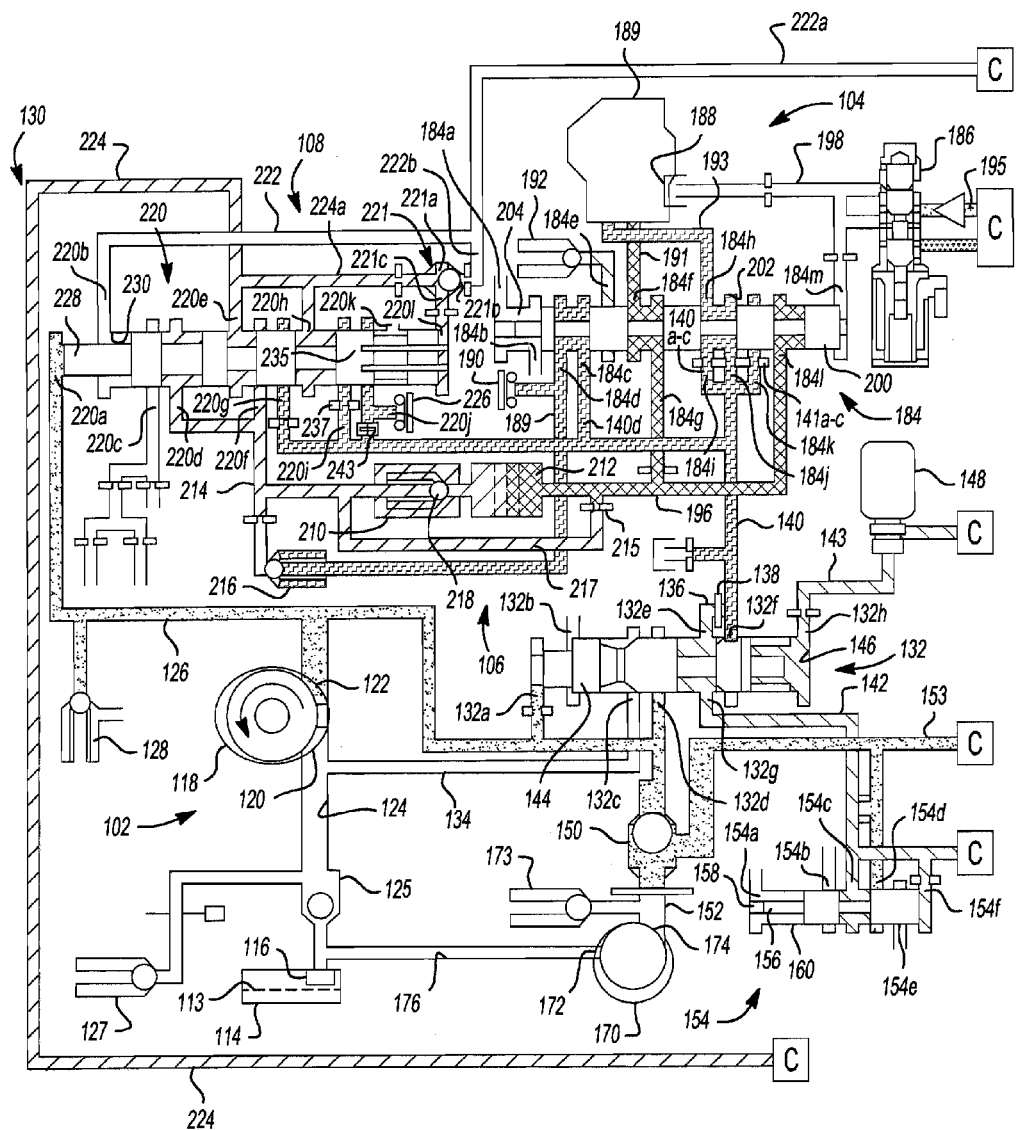
FIGS. 2A-2C is a diagram of a hydraulic control system according to the principles of the present invention in a Park Turbine Stall state of operation.
Figure 2B:
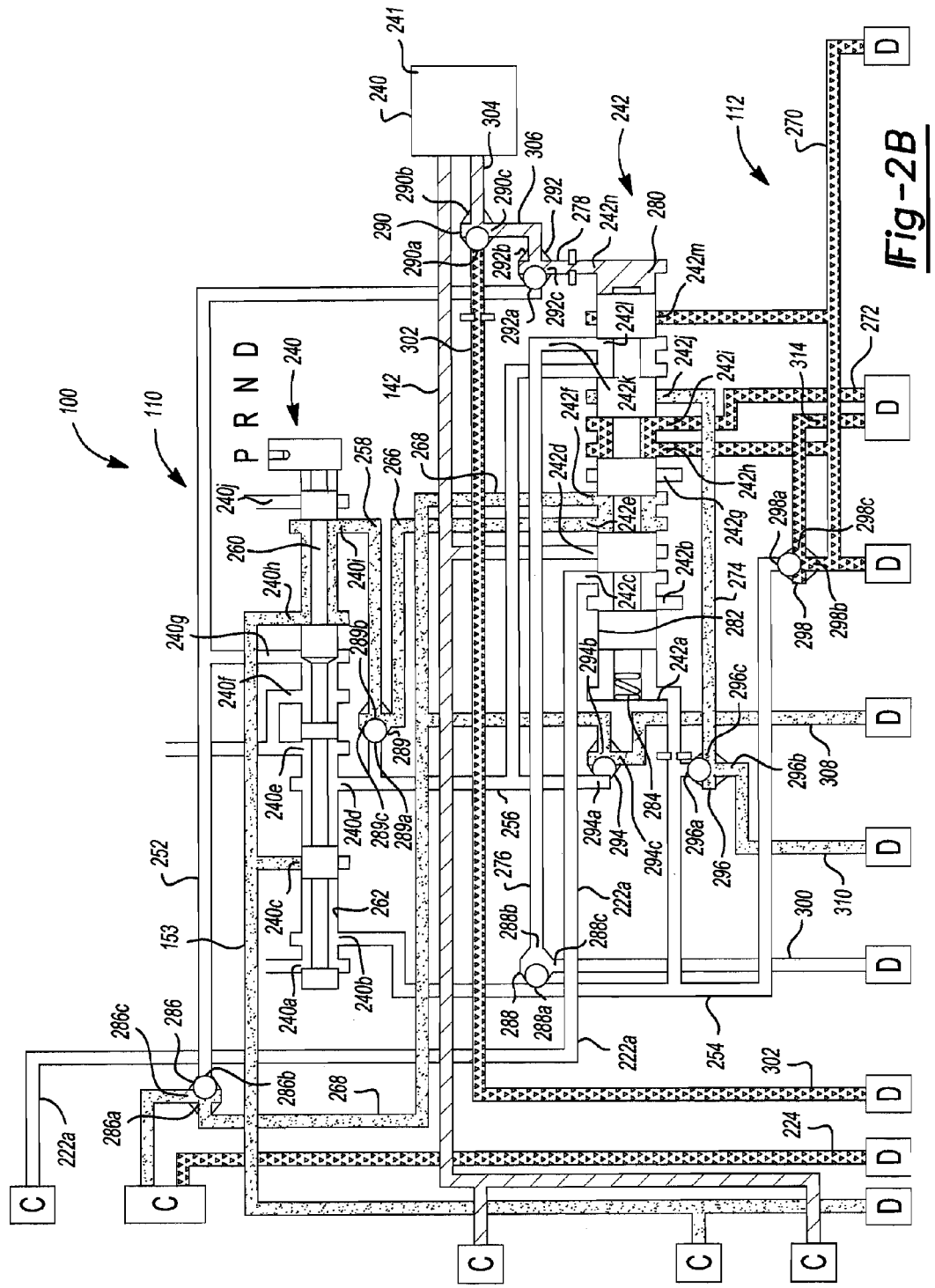
Figure 2C:
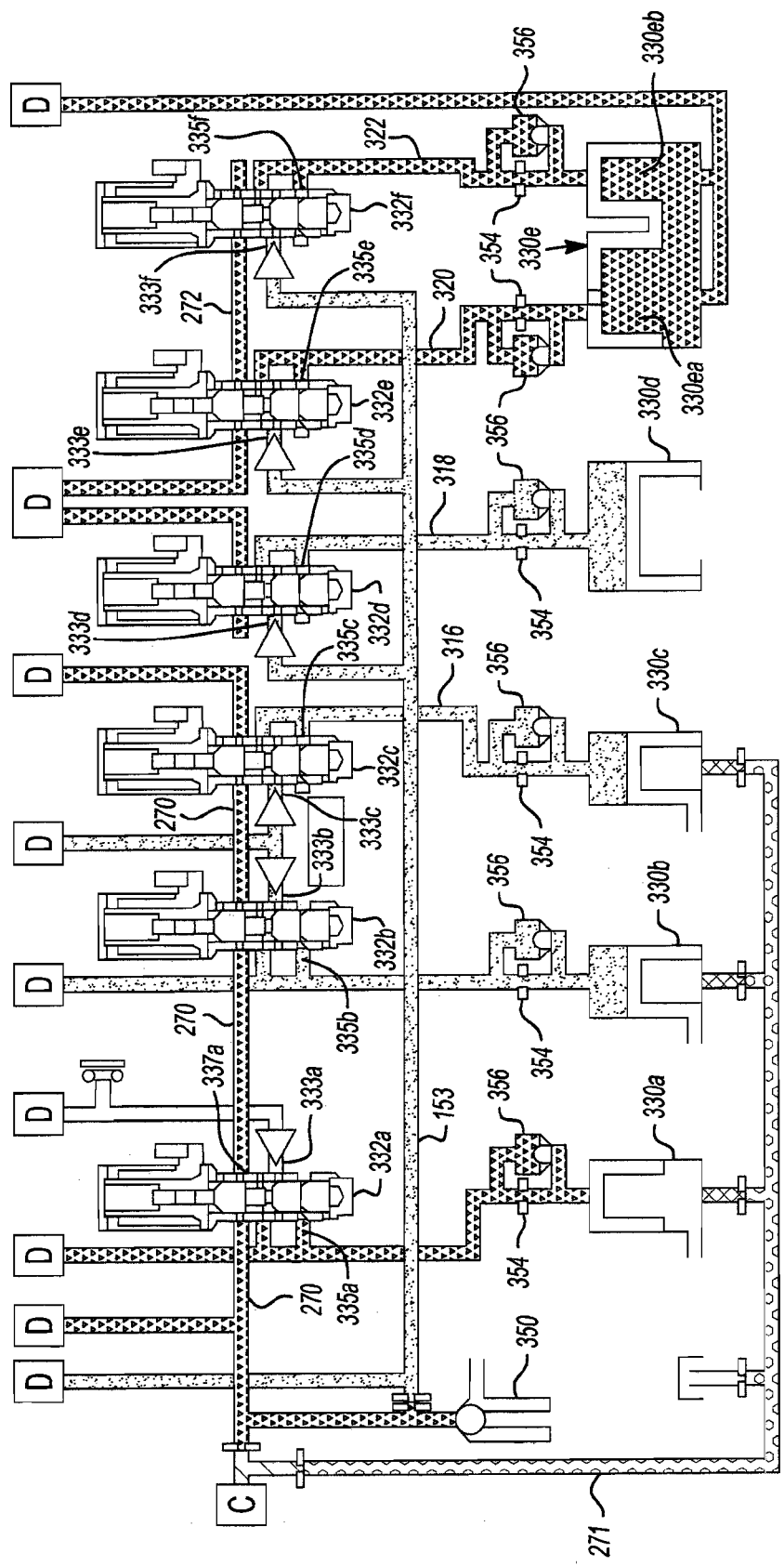

With combined reference to FIGS. 1A-1C, a hydraulic control system according to the principles of the present invention is generally indicated by reference number 100. The hydraulic control system 100 is operable to control torque transmitting mechanisms, such as synchronizers, clutches, and brakes within a transmission, as well as providing lubrication and cooling to components within the transmission and to control a torque converter coupled to the transmission. The hydraulic control system 100 includes a plurality of interconnected or hydraulically communicating subsystems including a pressure regulator subsystem 102, a torque converter control subsystem 104, a cooler flow subsystem 106, a lubrication control subsystem 108, a manual valve control subsystem 110, and a clutch control subsystem 112.

The pressure regulator subsystem 102 is operable to provide and regulate pressurized hydraulic fluid 113, such as oil, throughout the hydraulic control system 100. The pressure regulator subsystem 102 draws hydraulic fluid 113 from a sump 114. The sump 114 is a tank or reservoir preferably disposed at the bottom of a transmission housing to which the hydraulic fluid 113 returns and collects from various components and regions of the transmission. The hydraulic fluid 113 is forced from the sump 114 and communicated through a sump filter 116 and throughout the hydraulic control system 100 via a pump 118. The pump 118 is preferably driven by an engine (not shown) or other motor and may be, for example, a gear pump, a vane pump, a gerotor pump, or any other positive displacement pump. The pump 118 includes an inlet port 120 and an outlet port 122. The inlet port 120 communicates with the sump 114 via a fluid line 124 and a one-way check valve 125 that prevents drainage into the sump 114. The fluid line 124 also communicates with a safety blow-off valve 127.

The outlet port 122 of the pump 118 communicates pressurized hydraulic fluid 113 to a fluid line 126. The fluid line 126 is in communication with a spring biased blow-off safety valve 128, a lubrication valve 130 and a pressure regulator valve 132. The safety valve 128 is set at a relatively high predetermined pressure and if the pressure of the hydraulic fluid in the fluid line 126 exceeds this pressure, the safety valve 128 opens momentarily to relieve and reduce the pressure of the hydraulic fluid.

The pressure regulator valve assembly 132 includes ports 132A-H. Port 132A is in communication with fluid line 126. Port 132B is an exhaust port that communicates with the sump 114. Port 132C is in communication with a fluid line 134 that communicates with fluid line 124 (i.e. feeds back into the inlet port 120 of the pump 118). Port 132D is in communication with fluid line 126. Fluid port 132E is in communication with a fluid line 136 and via a flow restriction orifice 138 with a fluid line 140. Fluid port 132F is in communication with the fluid line 140. Fluid line 140 trifurcates into at least three parallel branches 140A, 140B, and 140C each having located therein variously sized flow restriction orifices 141A, 141B, and 141C, respectively. Port 132G is in communication with a fluid line 142. Port 132H is in communication with a fluid line 143.

The pressure regulator valve assembly 132 further includes a valve 144 slidably disposed within a bore 146. The valve 144 automatically changes position to dump excess flow from fluid line 126 until a pressure balance is achieved between the commanded pressure and the actual pressure. The valve 144 is modulated by a variable bleed solenoid 148 that communicates with fluid line 143. For example, the solenoid 148 commands a fluid pressure by sending pressurized hydraulic fluid to port 132H via line 143 to act on the valve 144. Simultaneously, fluid pressure from fluid line 126 enters port 132A and acts on the opposite side of the valve 144. Pressure balance between the commanded pressure from the solenoid 148 and pressure within line 126 is achieved as the valve 144 moves and allows selective communication between port 132D and port 132C, thereby bleeding pressure from fluid line 126.

Fluid line 126 also communicates downstream of the pressure regulator valve assembly 132 with a ball check pump switching valve 150. The valve 150 is in fluid communication with fluid line 126, a fluid line 152, and a fluid line 153. The valve 150 closes off whichever of the fluid lines 126 and 152 that is delivering the lower hydraulic pressure and provides communication between whichever of the fluid lines 126 and 152 having or delivering the higher hydraulic pressure and the fluid line 153. Fluid line 152 communicates with a feed limit valve assembly 154.

The feed limit valve assembly 154 limits the maximum pressure of hydraulic fluid to the torque converter control subsystem 104, the cooler control subsystem 106 as well as various control solenoids, as will be described below. The feed limit valve assembly 154 includes ports 154A-F. Ports 154C and 154F are in communication fluid line 142 and therefore port 132E of the pressure regulator valve 132. Port 154D is in communication with fluid line 153. Ports 154A, 154B, and 154E are exhaust ports that communicate with the sump 114.

The feed limit valve assembly 154 further includes a valve 156 slidably disposed within a bore 158. The valve 156 automatically changes position to reduce flow from fluid line 153 (i.e. line pressure from the pump 118) to fluid line 142. For example, the valve 156 is biased to a first position by a spring 160. In the first position, at least a partial flow of fluid from line 153 communicates from port 154D through the feed limit valve assembly 154 to port 154C and then to fluid line 142. As the pressure within fluid line 142 increases, feedback pressure acting on the valve 156 via port 154F moves the valve 156 against the spring 160, thereby further reducing the pressure of the hydraulic fluid within fluid line 142, until a pressure balance is achieved on the valve 156. By controlling the pressure to fluid line 142 which communicates through the pressure regulator valve 132 to fluid line 140, the feed limit valve 154 controls the maximum pressure feeding the TCC control subsystem 104 and the lubrication control subsystem 108.

The pressure regulator subsystem 102 further includes an alternate source of hydraulic fluid that includes an auxiliary pump 170. The auxiliary pump 170 is preferably driven by an electric engine, battery, or other prime mover (not shown) and may be, for example, a gear pump, a vane pump, a gerotor pump, or any other positive displacement pump. The auxiliary pump 170 includes an inlet port 172 and an outlet port 174. The inlet port 172 communicates with the sump 114 via a fluid line 176 and a safety blow off valve 173. The safety valve 173 is used to relieve excess pressure in fluid line 176 from the auxiliary pump 170. The outlet port 174 communicates pressurized hydraulic fluid to the fluid line 176. During high efficiency modes of operation when the engine, and therefore the pump 118, are inactive, and the auxiliary pump 170 is engaged, fluid flow from the auxiliary pump 170 is prevented from backfilling the pump 118 by the pump switching valve 150.

The TCC subsystem 104 receives pressurized hydraulic fluid from the feed limit valve assembly 154 and the pressure regulator valve assembly 132 via fluid line 140. The TCC subsystem 104 includes a TCC control valve 184 and a solenoid 186 that modulates pressure to a torque converter clutch 188 in a torque converter 189.

The TCC control valve assembly 184 includes ports 184A-M. Ports 184A and 184B are exhaust ports that communicate with the sump 114. Ports 184I, 184J, and 184K are each in communication with branches 140A, 140B, and 140C of fluid line 140, respectively. Port 184C communicates with a fluid line 184D. Fluid line 184D communicates with a TCC control valve pressure switch 190. Port 184D communicates with a branch 140D of fluid line 140. Port 184E communicates with a safety blow-off valve 192 that releases pressurized hydraulic fluid when the torque converter clutch 188 is on or engaged and the fluid pressure exceeds a predetermined amount. Port 184F communicates with the torque converter clutch 188 via a fluid line 191. Ports 184G and 184L communicate with a fluid line 196. Port 184H communicates with the torque converter 189 via a fluid line 193. Finally, port 184M communicates with a fluid line 198. Fluid line 198 communicates with the solenoid 186 and with the torque converter clutch 188. The solenoid 186 is preferably a high flow, direct acting variable force solenoid, though other types of actuating devices may be employed without departing from the scope of the present disclosure. The solenoid 186 is also in communication with a fluid line 195.

The TCC control valve assembly 184 further includes a valve 200 slidably disposed within a bore 202. The valve 200 is actuated by the solenoid 186 that actuates the valve 200 against a spring 204. In a first position with the valve 200 not shifted against the spring 204 (i.e. a de-stroked position), hydraulic fluid from fluid line 140 is directed through the branches 140A-B and orifices 141A-B to ports 184I and 184J, through the valve assembly 184 to port 184H, and then to the torque converter 189. The output of the torque converter 189 communicates through line 191 to port 184F of the TCC control valve assembly 184, from port 184F to port 184G and on to the cooler control subsystem 106. The valve 200 is shifted against the spring 204 and the torque converter clutch 188 is engaged by activation of the solenoid 186. As pressure of the hydraulic fluid acting on the valve 200 from port 184M via the solenoid 186 increases, a threshold is crossed where the valve 200 is shifted against the spring 204. As the valve 200 shifts, hydraulic fluid from fluid line 140 is directed through the branches 140A-C and orifices 141A-C, thereby controlling the rate of hydraulic fluid flow to port 184H and therefore the rate of hydraulic fluid flow to the torque converter 189. For example, as the valve 200 shifts, port 184K communicates with port 184L, thereby bleeding off flow from fluid line 140 to fluid line 196, and port 184J closes thereby further reducing the fluid flow to port 184H. As the valve 200 shifts completely against the spring 204, the valve 200 diverts the output from the torque converter clutch 188 via port 184F to port 184E such that the hydraulic fluid leaving the torque converter 189 returns to the sump 114 via the blow-off valve 192. Accordingly, the TCC control valve 184 controls the flow rate of hydraulic fluid to the torque converter 189 and to the oil cooler subsystem 106.

The cooler control subsystem 106 includes an oil cooler 212 and a fine micron oil filter 210. The oil cooler 212 is in communication with fluid line 196. The oil filter 210 is in communication with the oil cooler 212 and with a fluid line 214. A bypass line 217 is disposed in parallel with the oil filter 210 and the oil cooler 212 and allows hydraulic fluid to bypass the oil filter 210 and the oil cooler 212 during a torque converter stall event, as will be described in greater detail below. Fluid line 214 communicates with the lubrication control subsystem 108 and a spring biased one-way valve 216. The one-way valve 216 communicates with fluid line 189. If the pressure of the hydraulic fluid in the fluid line 214 exceeds a pressure threshold, the one-way valve 216 opens momentarily to relieve and reduce the pressure of the hydraulic fluid within fluid line 214. The cooler control subsystem 106 further includes a spring biased blow-off safety valve 218 disposed either in parallel with the oil filter 210 or integrated within the oil filter 210 that allows hydraulic fluid to bypass the oil filter 210 in the event of inadequate cooler flow. The blow-off valve 218 is set at a predetermined pressure and if the pressure of the hydraulic fluid in the fluid line 196 exceeds this pressure, the blow-off valve 218 opens momentarily to increase the flow of hydraulic fluid from the cooler flow subsystem 106. Finally, fluid lines 196 and 214 communicate in parallel with the cooler 212 and filter 210 to provide a bypass circuit having an orifice 215.

The lubrication control subsystem 108 regulates lubrication fluid pressure as a function of line pressure delivered from the pump 118 or auxiliary pump 170. Hydraulic fluid regulated by the lubrication control subsystem 108 lubricates and cools the various moving parts of the transmission and provides the source of hydraulic fluid for filling a clutch centrifugal compensator. The lubrication control subsystem 108 receives hydraulic fluid from the cooler flow subsystem 106 via fluid line 214.

The lubrication control subsystem 108 includes a lubrication regulator valve assembly 220 and a ball check valve 221. The ball check valve 221 includes three ports 221A-C. The ball check valve 221 closes off whichever of the ports 221A and 221B that is delivering the lower hydraulic pressure and provides communication between whichever of the ports 221A and 221B having or delivering the higher hydraulic pressure and the outlet port 221C.

The lubrication regulator valve assembly 220 includes ports 220A-L. Port 220A communicates with fluid line 126 and therefore receives line pressure from the pump 118. Port 220B communicates with a fluid line 222. Fluid line 222 includes two branches 222A and 222B. Branch 222A communicates with the manual valve subsystem 110 and branch 222B communicates with port 221B of the ball check valve 221. Ports 220C and 220K are exhaust ports that communicate with the sump 114. Ports 220D and 220F communicate with fluid line 214. Ports 220E and 220H communicate with a fluid line 224. Fluid line 224 includes a branch 224A that communicates with port 221A of the ball check valve 221. Ports 220G, 220I and 220J communicate with fluid line 140 and with a pressure switch 226. Finally, port 220L communicates with port 221C of the ball check valve 221.

The lubrication regulator valve assembly 220 further includes a valve 228 slidably disposed within a bore 230. The valve 228 has three functional positions: a basic regulating position, a supplemental regulating position shown, and an override position shown. The valve 228 is moved between the positions based on a balance of forces acting on each of the ends of the valve 228. The basic regulating position provides an output pressure via fluid line 224 that is proportional to the line pressure (i.e. the pressure in fluid line 126). In the basic regulating position, line pressure via fluid line 126 enters port 220A and acts on an end of the valve 228 against the bias of a spring 235. As the valve 228 strokes against the spring 235, port 220F communicates with port 220E. Accordingly, hydraulic fluid flow from the cooler subsystem 106 communicates from fluid line 214 to port 220F, through the valve 228, and out fluid port 220E to fluid line 224. Feedback pressure from fluid line 224 communicates through branch 224A, through the ball check valve 221, and into the valve assembly 220. The hydraulic fluid acts on the valve 228 and creates a balancing force against the line pressure which keeps the valve 228 in a position to regulate the fluid flow to fluid line 224. In addition, ports 220I, 220J, 220C, and 220G are isolated by the valve 228, which in turn keeps the fluid pressure within fluid line 140 high which in turn allows the pressure switch 226 to sense a high pressure thereby indicating that the valve 228 is regulating fluid flow to fluid line 224.

If the fluid flow from the cooler subsystem 106 drops sufficiently, the line pressure acting on the valve 228 from fluid line 126 will move the valve 228 to the supplemental or stroked position. In the supplemental position, not only is fluid flow from the cooler subsystem 106 increased by opening port 220F to port 220E, but in addition port 220I is allowed to communicate with fluid port 220H. Accordingly, fluid flow from the feed limit valve 154 is communicated to the lubrication control valve 220 via fluid line 140, thereby increasing the fluid flow to fluid line 224. A flow restriction orifice 237 in fluid line 140 limits the flow of hydraulic fluid to the lubrication control valve 220.

Finally, the override position is achieved by activating a solenoid 241 that is in communication with fluid line 222A through the manual valve subsystem 110. The override position is activated during low line pressures (e.g. during a low engine torque condition such as when the pump 118 is operating at a reduced speed due to engine idling). Solenoid 241 is an on/off solenoid that is multiplexed with the manual valve subsystem 110, as will be described in greater detail below. The hydraulic fluid flow from the solenoid 241, when activated, communicates with the ball check valve 221 via fluid line 222A. The ball check valve 221 prevents the fluid flow from the solenoid 241 from entering fluid line 224. As the fluid flow from the solenoid 241 enters port 220L, the hydraulic fluid contacts the valve 228 and, along with the spring 235, moves the valve to a de-stroked position. In the override position, port 220F is isolated from port 220E. However, port 220G is allowed to communicate with port 220H. Fluid flow from the cooler subsystem 106 via fluid line 214 is reduced by the relatively narrow override orifice 237. In addition, port 220D, previously isolated, is allowed to communicate with port 220C. Therefore, fluid flow from the cooler subsystem 106 is further reduced as fluid flow is diverted through fluid line 214 to port 220D, from port 220D to port 220C, and out port 220C to the sump 114. Finally, port 220J is allowed to communicate with port 220K, thereby allowing the fluid flow from the feed limit valve 154 via fluid line 140 to exhaust to the sump 114. However, due to gasket slots 243 positioned upstream of the pressure switch 226, the pressure between the pressure switch 226 and the exhaust port 220L drops. The drop in pressure sensed by the pressure switch 226 confirms that the valve 228 is in the override position. The override position greatly reduces the flow of hydraulic fluid to fluid line 224 and therefore to the components of the transmission, thereby reducing the parasitic spin loss. The override position is used under low power generation conditions, such as engine idle.

The lubrication regulator valve pressure switch 226 and the TCC control valve pressure switch 190 cooperate to diagnose a stuck pressure regulator valve assembly 132, a stuck feed limit valve assembly 154, a stuck TCC control valve assembly 184, or a stuck lubrication regulator valve assembly 220. A non-pressurized state is assigned to the TCC applied position of the TCC control valve assembly 184 and to the lubrication override position of the lubrication valve assembly 220. Both pressure switches 226, 190 are fed with hydraulic fluid pressurized by the feed limit valve assembly 154. Depending on the commanded state of the valve assemblies 184, 220, both pressure switches 226, 190 indicating no pressure can be used as a diagnostic signal.

The manual valve subsystem 110 uses hydraulic fluid from the pump 118 or the auxiliary pump 170 via fluid line 153 to selectively provide flows of hydraulic fluid to the clutch actuator subsystem 112 in order to engage various gear ratios. The manual valve subsystem 110 includes previously described solenoid 241 as well as a manual valve assembly 240 and a default valve assembly 242, as well as a plurality of ball check valves described below.

The manual valve assembly 240 includes ports 240A-J. Ports 240A, 240E, 240F, and 240J are exhaust ports that communicate with the sump 114. Port 240C communicates with fluid line 153. Port 240G communicates with a fluid line 252. Port 240H communicates with fluid line 153. Port 240B communicates with a fluid line 254. Port 240D communicates with a fluid line 256. Port 240I communicates with a fluid line 258.

The manual valve assembly 240 further includes a valve 260 slidably disposed within a bore 262. The valve 260 is manually actuated by a range selector or other mechanism located in the motor vehicle. The valve 260 is manually moveable between a Park position, a Reverse position, a Neutral position, and a Drive position. When the valve 260 is in the Park position, shown in FIGS. 1A-1C and 2A-C, port 240A communicates with port 240B, port 240D communicates with port 240E, port 240F communicates with port 240G, port 240H communicates with port 240I, and ports 240C and 240I are isolated by the valve 260.

When the valve 260 is in the Reverse position, port 240C communicates with port 240B, port 240H is isolated, port 240D communicates with port 240E, and port 240F communicates with port 240G.

When the valve 260 is in the Neutral position, port 240A communicates with port 240B, port 240C is isolated, port 240D communicates with ports 240E and 240F, port 240H communicates with port 240G, and port 240I communicates with port 240J.

When the valve 260 is in the Drive position, as shown in FIGS. 3A-3C, 4A-4C, 5A-5C, and 6A-6C, port 240A communicates with port 240B, port 240C communicates with port 240D, ports 240E, 240F, and 240G communicate, port 240H is isolated, and port 240I communicates with port 240J.

The default valve assembly 242 includes ports 242A-N. Port 242A communicates with fluid line 254. Ports 242B and 242G are exhaust ports that communicate with the sump 114. Port 242C communicates with fluid line 222A. Port 242D communicates with fluid line 142. Port 242E communicates with a fluid line 266. Port 242F communicates with a fluid line 268. Ports 242H and 242M communicate with a fluid line 270. Port 242I communicates with a fluid line 272. Port 242J communicates with a fluid line 274. Port 242K communicates with fluid line 256. Port 242L communicates with a fluid line 276. Finally, port 242N communicates with a fluid line 278.

The default valve assembly 242 further includes a valve 280 slidably disposed within a bore 282. The valve 280 is actuated by a spring 284 and by hydraulic fluid acting against the bias of the spring 284 via port 242N. The valve 280 is moveable between a stroked position where the spring 284 is compressed and a de-stroked position. In the de-stroked position, shown in FIGS. 1A-1C, 2A and 2C, 3A-3C, and 4A-4C, port 242B is closed or isolated, port 242C communicates with port 242D, port 242E is closed, port 242F exhausts to port 242G, port 242H is closed, port 242I communicates with port 242J, port 242K is closed, and port 242L communicates with port 242M. In the stroked position, shown in FIGS. 5A-5C and 6A-6C, port 242C exhausts to port 242B, port 242D is closed, port 242E communicates with port 242F, port 242G is closed, port 242H communicates with port 242I, port 242J is closed, port 242K communicates with port 242L, and port 242M is closed.

The manual valve assembly 240, the default valve assembly 242, and the actuator control subsystem 112 are each interconnected by a plurality of check ball valves 286, 288, 289, 290, 292, 294, 296 and 298. The check ball valves 286, 288, 289, 290, 292, 294, 296, and 298 collectively operate to direct hydraulic fluid flow automatically based on the pressure of the hydraulic fluid delivered to each input port. For example, the ball check valve 286 includes three ports 286A-C. The ball check valve 286 closes off whichever of the ports 286A and 286B that is delivering the lower hydraulic pressure and provides communication between whichever of the ports 286A and 286B having or delivering the higher hydraulic pressure and the outlet port 286C. Fluid port 286A communicates with fluid line 268, fluid port 286B communicates with fluid line 252, and port 286C communicates with fluid line 195.

The ball check valve 288 includes three ports 288A-C. The ball check valve 288 closes off whichever of the ports 288A and 288B that is delivering the lower hydraulic pressure and provides communication between whichever of the ports 288A and 288B having or delivering the higher hydraulic pressure and the outlet port 288C. Fluid port 288A communicates with fluid line 254, fluid port 288B communicates with fluid line 276, and port 288C communicates with a fluid line 300.

The ball check valve 289 includes three ports 289A-C. The ball check valve 289 closes off whichever of the ports 289A and 289B that is delivering the lower hydraulic pressure and provides communication between whichever of the ports 289A and 289B having or delivering the higher hydraulic pressure and the outlet port 289C. Fluid port 289A communicates with fluid line 256, fluid port 288B communicates with fluid line 258, and port 288C communicates with a fluid line 266.

The ball check valve 290 includes three ports 290A-C. The ball check valve 290 closes off whichever of the ports 290A and 290B that is delivering the lower hydraulic pressure and provides communication between whichever of the ports 290A and 290B having or delivering the higher hydraulic pressure and the outlet port 290C. Fluid port 290A communicates with a fluid line 302, fluid port 290B communicates with a fluid line 304, and port 290C communicates with a fluid line 306.

The ball check valve 292 includes three ports 292A-C. The ball check valve 292 closes off whichever of the ports 292A and 292B that is delivering the lower hydraulic pressure and provides communication between whichever of the ports 292A and 292B having or delivering the higher hydraulic pressure and the outlet port 292C. Fluid port 292A communicates with fluid line 252, fluid port 292B communicates with fluid line 306, and port 292C communicates with fluid line 278.

The ball check valve 294 includes three ports 294A-C. The ball check valve 294 closes off whichever of the ports 294A and 294B that is delivering the lower hydraulic pressure and provides communication between whichever of the ports 294A and 294B having or delivering the higher hydraulic pressure and the outlet port 294C. Fluid port 294A communicates with fluid line 256, fluid port 294B communicates with fluid line 268, and port 294C communicates with a fluid line 308.

The ball check valve 296 includes three ports 296A-C. The ball check valve 296 closes off whichever of the ports 296A and 296B that is delivering the lower hydraulic pressure and provides communication between whichever of the ports 296A and 296B having or delivering the higher hydraulic pressure and the outlet port 296C. Fluid port 296A communicates with fluid line 254, fluid port 296B communicates with a fluid line 310, and port 296C communicates with fluid line 274.

The ball check valve 298 includes three ports 298A-C. The ball check valve 298 closes off whichever of the ports 298A and 298B that is delivering the lower hydraulic pressure and provides communication between whichever of the ports 298A and 298B having or delivering the higher hydraulic pressure and the outlet port 298C. Fluid port 298A communicates with fluid line 254, fluid port 298B communicates with fluid line 270, and port 298C communicates with fluid line 314. Fluid line 270 communicates with fluid line 224 and a fluid line 271, forming a lubrication feed and exhaust circuit. It should be appreciated that fluid lines 270, 224, and 271 may be considered separate fluid lines or a single branching fluid line without departing from the scope of the present invention. In addition, it should be appreciated that other types of valves may be employed without departing from the scope of the present invention.

The clutch control subsystem 112 provides hydraulic fluid to clutch actuators 330A-E. The clutch actuators 330A-E are hydraulically actuated pistons that each engage one of the plurality of torque transmitting devices to achieve various speed ratios. Clutch actuator 330E includes two apply areas 330Ea and 330Eb. Each of the clutch actuators 330A-E are controlled by a variable force solenoid 332A-F, with clutch actuator 330E controlled by two variable force solenoids 332E and 332F. This separate control of clutch actuator 330E provides maximum flexibility to tailor clutch torque characteristics to a wide range of high torque and low torque shifting conditions.

Solenoid 332A is in communication with fluid line 300, fluid line 302, and fluid line 270. Solenoid 332A is preferably a normally high solenoid. When the solenoid 332A is de-energized, fluid line 300 communicates with fluid line 302. When the solenoid 332A is energized, fluid line 302 communicates with fluid line 270. Fluid line 302 delivers hydraulic fluid to the shift actuator 330A.

Solenoid 332B is in communication with fluid line 310, fluid line 308, and fluid line 270. Solenoid 332B is preferably a normally high solenoid. When the solenoid 332B is de-energized, fluid line 308 communicates with fluid line 310. When the solenoid 332B is energized, fluid line 310 communicates with fluid line 270. Fluid line 310 delivers hydraulic fluid to the shift actuator 330B.

Solenoid 332C is in communication with fluid line 308, a fluid line 316, and fluid line 270. Solenoid 332C is preferably a normally high solenoid. When the solenoid 332C is de-energized, fluid line 308 communicates with fluid line 316. When the solenoid 332C is energized, fluid line 316 communicates with fluid line 270. Fluid line 316 delivers hydraulic fluid to the shift actuator 330C.

Solenoid 332D is in communication with fluid line 153, a fluid line 318, and fluid line 314. Solenoid 332D is preferably a normally low solenoid. When the solenoid 332D is energized, fluid line 153 communicates with fluid line 318. When the solenoid 332D is de-energized, fluid line 318 communicates with fluid line 270. Fluid line 318 delivers hydraulic fluid to the shift actuator 330D.

Solenoid 332E is in communication with fluid line 153, a fluid line 320, and fluid line 272. Solenoid 332E is preferably a normally low solenoid. When the solenoid 332E is energized, fluid line 153 communicates with fluid line 320. When the solenoid 332E is de-energized, fluid line 320 communicates with fluid line 272. Fluid line 320 delivers hydraulic fluid to the shift actuator 330Ea.

Solenoid 332F is in communication with fluid line 153, a fluid line 322, and fluid line 272. Solenoid 332F is preferably a normally low solenoid. When the solenoid 332F is energized, fluid line 153 communicates with fluid line 322. When the solenoid 332F is de-energized, fluid line 322 communicates with fluid line 272. Fluid line 322 delivers hydraulic fluid to the shift actuator 330Eb.

Each of the solenoids 332A-F include inlet ports 333A-F and outlet ports 335A-F, respectively, that communicate with each other when the solenoids 332A-F are open. Additionally, each of the solenoids 332A-F include exhaust ports 337A-F that communicate with at least one of the inlet ports 333A-F and the outlet ports 335A-F.

Each of the shift actuators 330A-C is fed lubrication oil via fluid line 224, 270, and 271. A safety valve 350 in communication with fluid line 224 is set at a predetermined pressure to regulate the pressure of the hydraulic fluid within the fluid line 224. This ensures that the clutch control circuits remain full when not being used to minimize response time.

In addition, each of the fluid lines 302, 310, 316, 318, 320, and 322 that feed the shift actuators 330A-F include an orifice 354 disposed in parallel with a one way valve 356. The orientation of the one-way valve 356 is such that the one way valve 356 allows communication from the clutch actuators 330A-E to the solenoids 332A-F and prevents fluid communication from the solenoids 332A-F to the shift actuators 330A-E. This arrangement forces oil feeding the shift actuators 330A-E to be controlled through the orifices 354.

FIGS. 1A-1C illustrate the hydraulic control system 100 in the Park state. In this state, the default valve 280 is de-stroked. The pressure regulation subsystem 102 charges the TCC control subsystem 104, the cooler subsystem 106, and the lubrication control subsystem 108 with hydraulic fluid at feed limit pressure. In addition, solenoid 241 is also charged with hydraulic fluid at feed limit pressure.

Following initial start-up of the motor vehicle, the torque converter 189 can be placed in a stall condition wherein the pump is rotating but the turbine has not yet begun to rotate. This allows the transmission to warm up faster for better performance and fuel economy. In this stall condition, it is desirable to keep hydraulic fluid flowing within the torque converter 189. Accordingly, the hydraulic system 100 is operable to provide a Park stall feature, illustrated in FIGS. 2A-2C. In this condition, solenoid 241 is activated or opened. Hydraulic fluid from the pressurized hydraulic fluid source 102 communicates through fluid line 142, through the solenoid 241, and into ball check valves 290 and 292. The ball check valves 290 and 292 close off fluid lines 302 and 252, respectively. The hydraulic fluid from the solenoid 241 engages the default valve 280 and moves the default valve to the stroked position. Accordingly, hydraulic fluid at line pressure from the manual valve assembly 240 is diverted by the default valve 280 into fluid line 268 and the flow of hydraulic fluid to the lubrication valve 228 via line 222A is cut off. By cutting off fluid flow into fluid line 222A, the lubrication valve 228 is stroked. Meanwhile, the fluid flow into fluid line 268 is communicated through ball check valve 294 to solenoids 332B and 332C. These solenoids are opened and the actuators 330B and 330C are stroked.

Figure 3A:
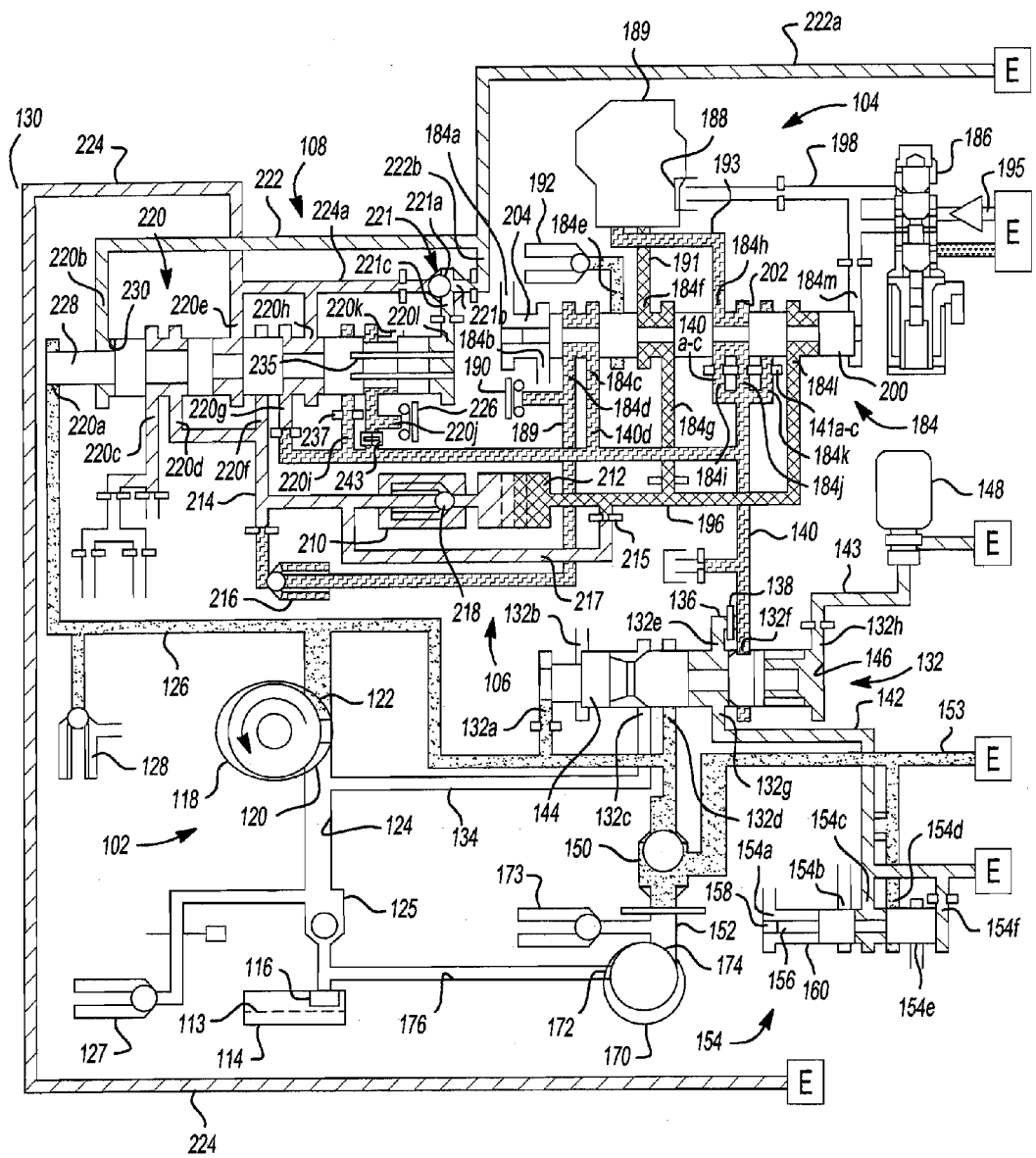
Figure 3C:
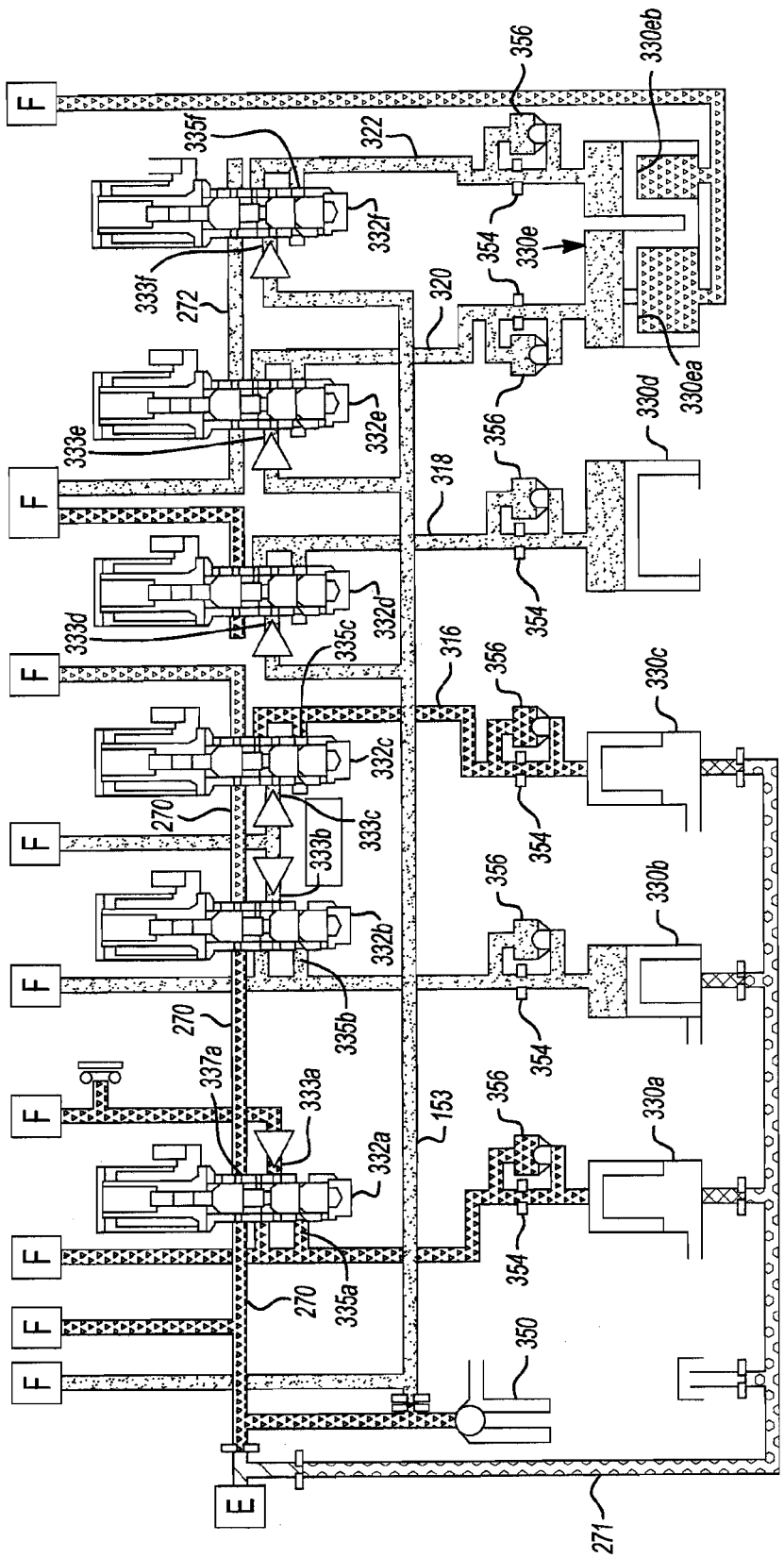

The hydraulic control system 100 also includes two Drive failure modes, each configured to provide a forward gear ratio in the event of an electrical fault that renders any electrically controlled devices, such as the solenoids, inoperable. Turning to FIGS. 3A-3C, a normal Drive low speed control is illustrated. In this condition, the manual valve is in the Drive position and solenoid 241 is closed, thereby placing the default valve in the de-stroked position. Hydraulic fluid at line pressure from the pressure regulator subsystem 102 communicates from line 153, through the manual valve 260, and into fluid line 256. Ball check valve 289 prevents backfill into fluid line 258 and ball check valve 294 prevents backfill into fluid line 268. The hydraulic fluid continues into fluid line 308 thereby providing fluid to solenoids 332B and 332C. Meanwhile, hydraulic fluid via line 153 provides hydraulic fluid to solenoids 332D, 332E, and 332F. For example, to engage a first gear, solenoids 332B, 332D, 332E, and 332F are opened to engage actuators 330B, 330D, 330Ea and 330Eb. A second gear is engaged by opening solenoids 332C, 332D, 332E and 332F. A third gear is engaged by opening solenoids 332B, 332C, 332E and 332F.

Figure 4A:
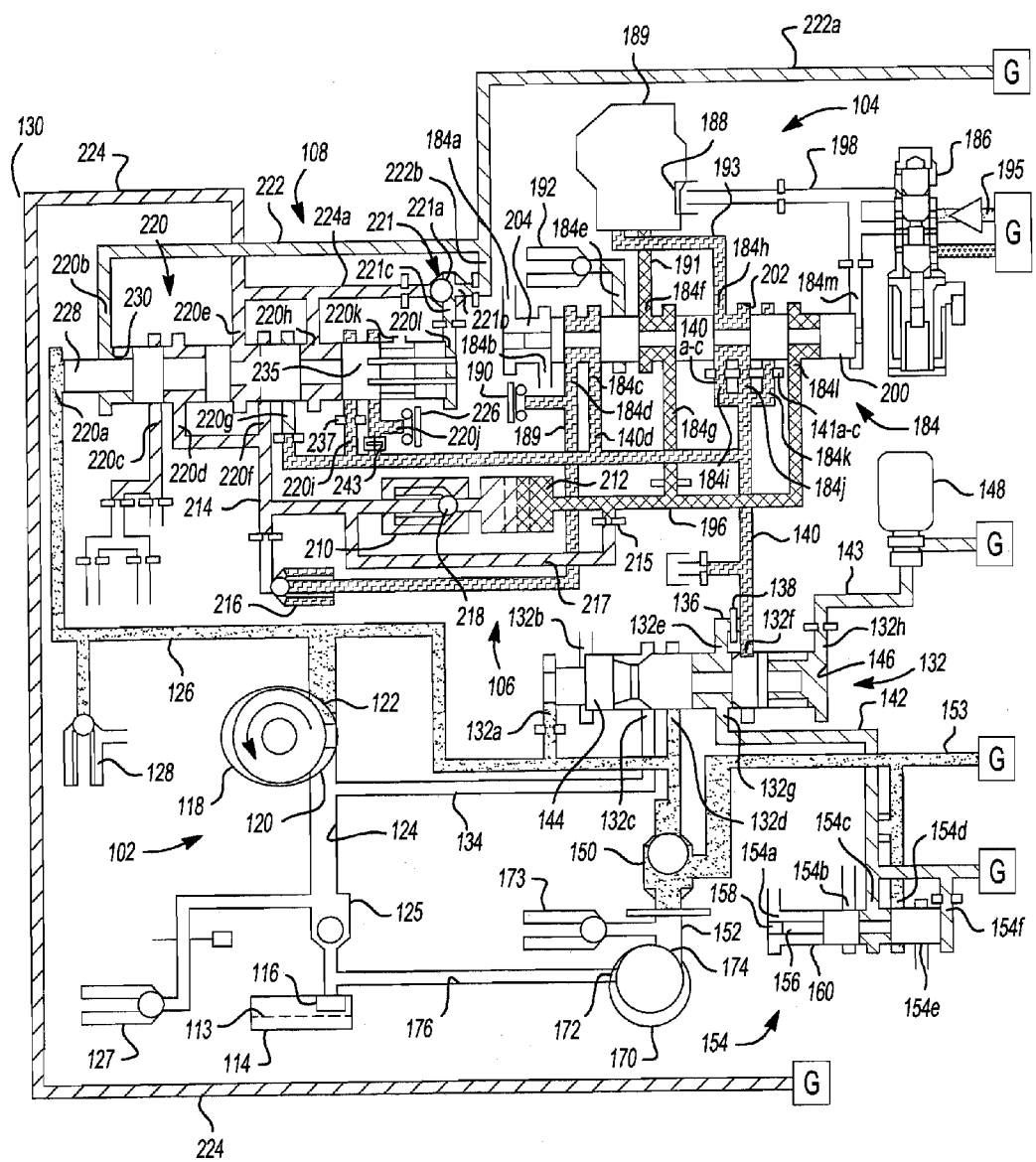
Figure 4C:
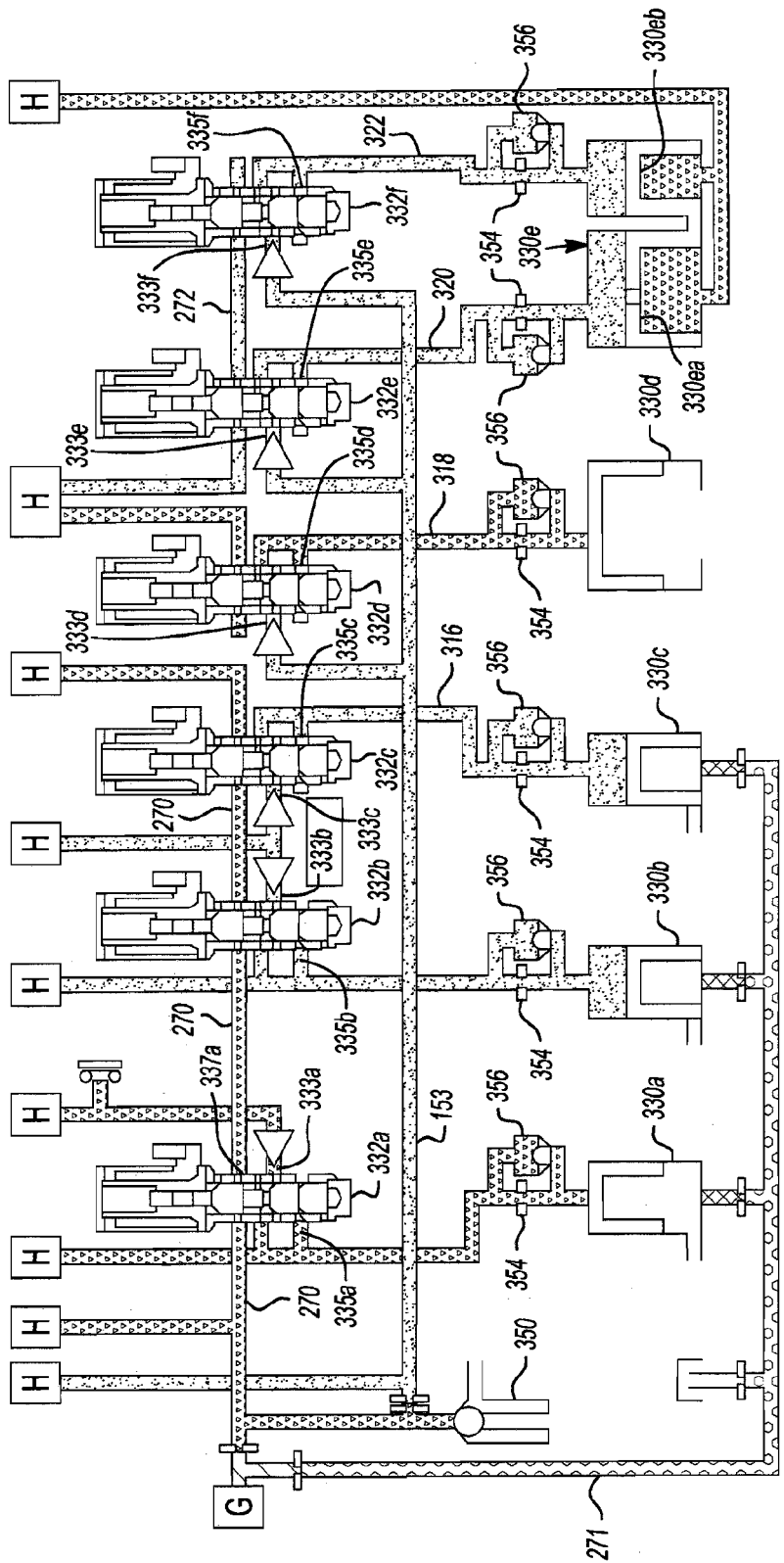
Figure 5A:
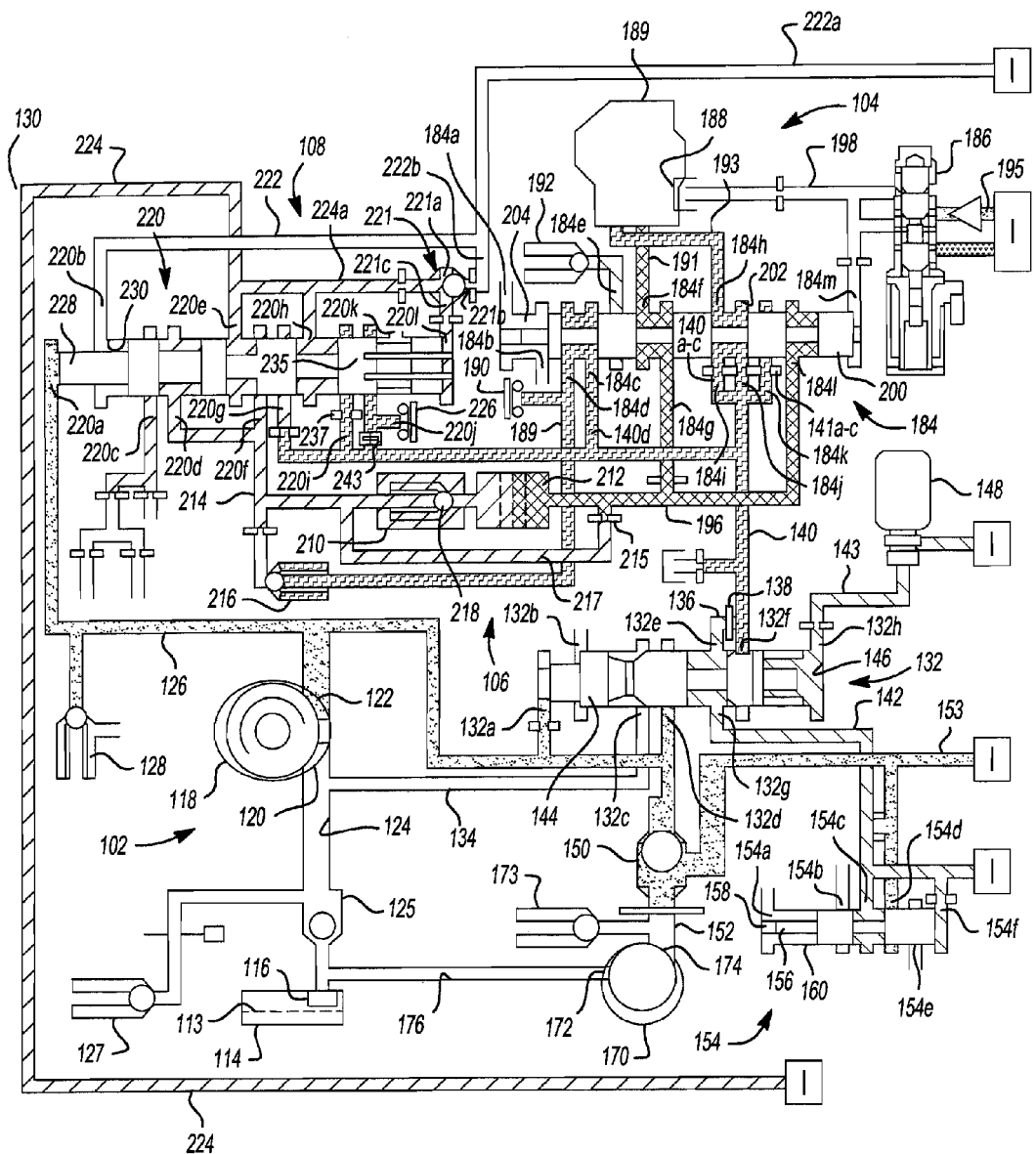
FIGS. 5A-5C is a diagram of a hydraulic control system according to the principles of the present invention in a Drive First High Speed state of operation.
Figure 5B:
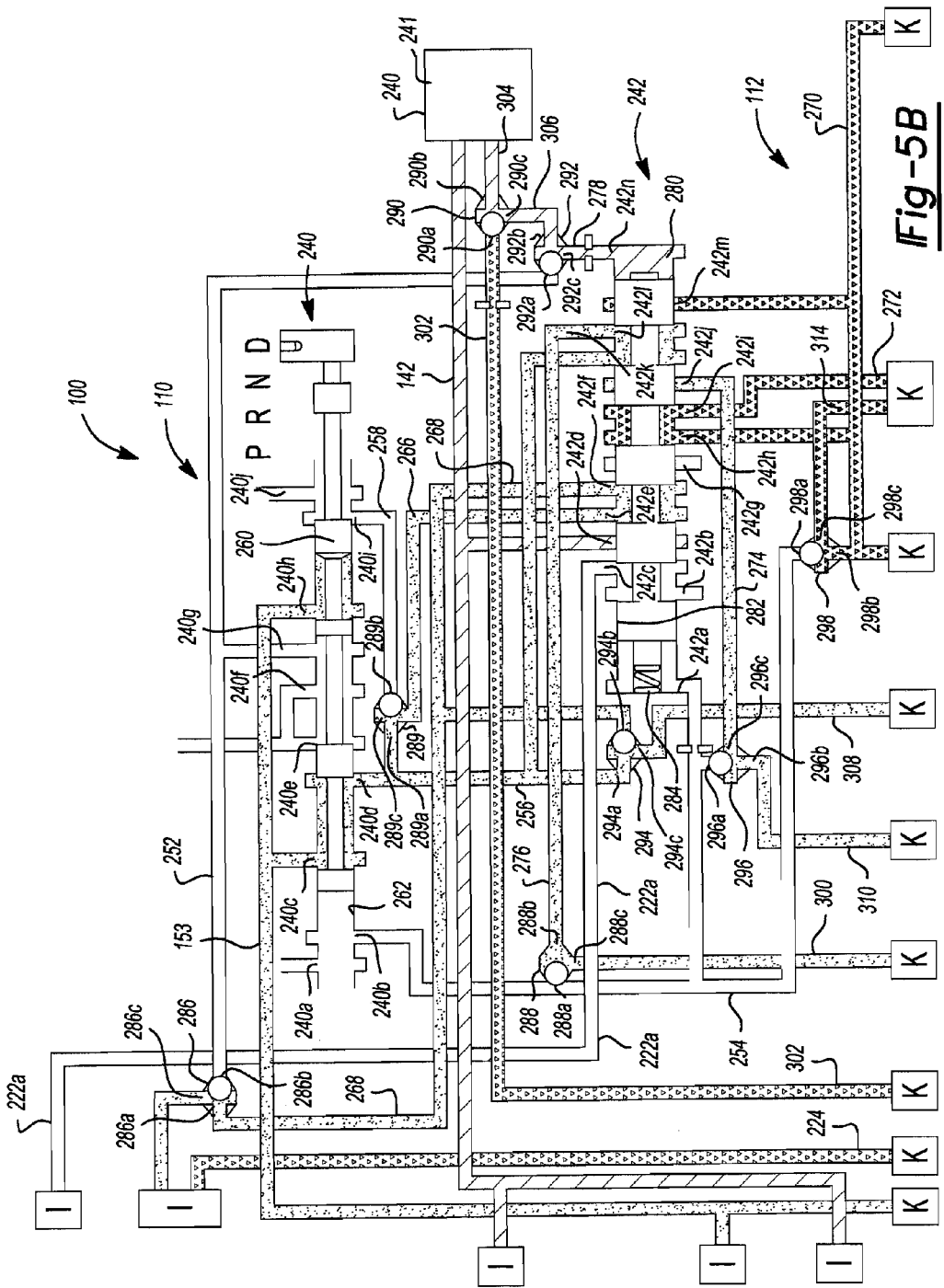
Figure 5C:
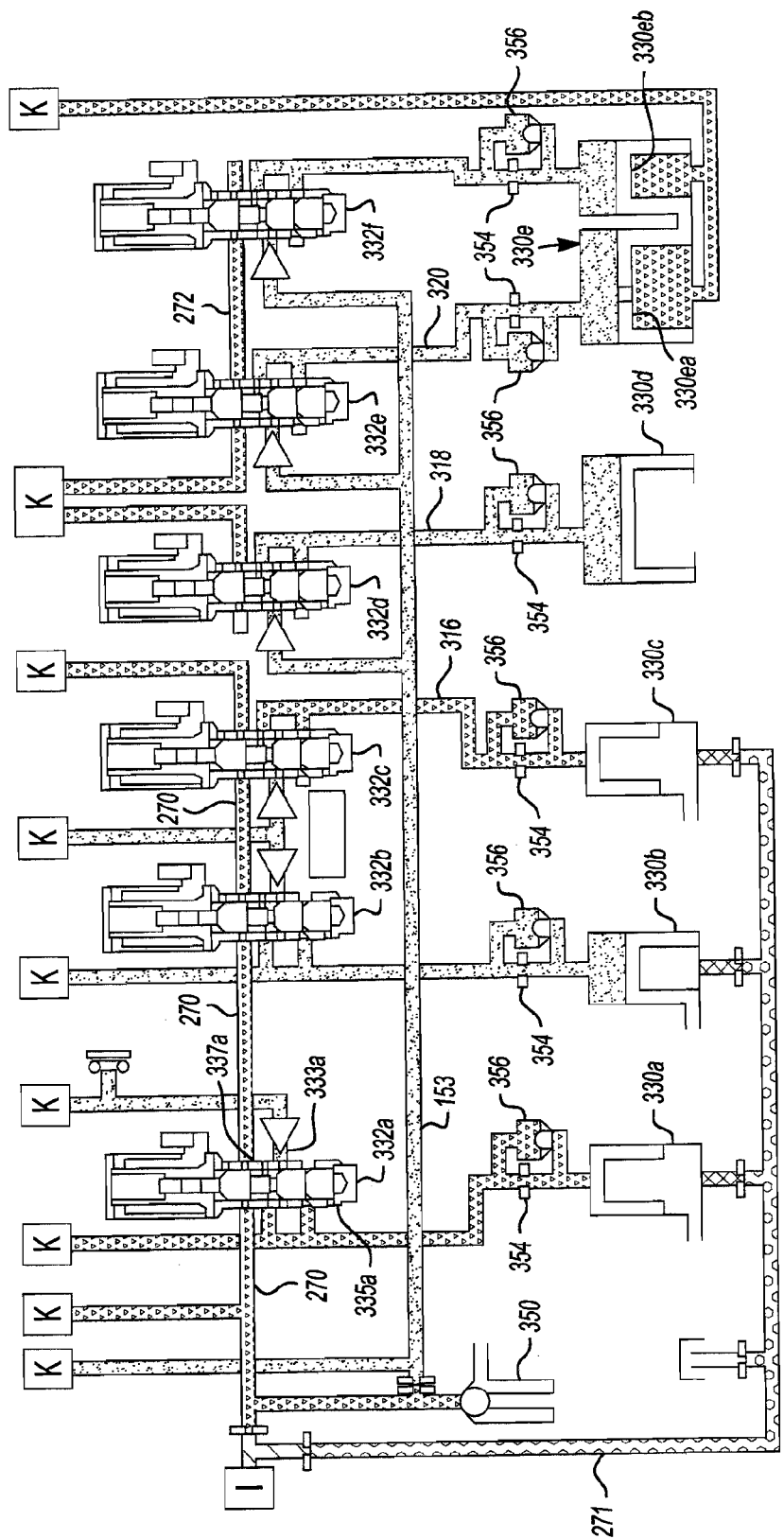

In the event of an electrical failure within the transmission when the motor vehicle is in one of the first, second, or third speed ratios, the hydraulic control system 100 enters a third gear Drive default state, shown in FIGS. 4A-4C. In this condition, solenoids 332A, 332B, and 332C default to an open state while solenoids 332D, 332E, and 332F default to a closed state. Hydraulic fluid flow at line pressure is maintained through the manual valve 260 to solenoids 332B and 332C, and the hydraulic fluid passes there through to feed actuators 330A and 330B. In addition, hydraulic fluid in fluid line 310, which feeds actuator 330B, communicates through ball check valve 296 to fluid line 274, and through the default valve 280 into fluid line 272. Accordingly, the exhaust of the solenoids 332E and 332F are transformed into inlets and hydraulic fluid passes through the solenoids 332E and 332F to engage actuators 330Ea and 330Eb, thereby engaging the third gear and assuring that an electrical failure will not result in the motor vehicle not being drivable.

During normal high speed ratio Drive operations, solenoid 241 is opened and the default valve 280 is moved to the stroked position. Hydraulic fluid at line pressure is supplied to the solenoids 332B, 332C, 332D, 332E, and 332F through fluid line 153 and the manual valve 260, as described above for low speed ratios. However, hydraulic fluid flow from line 266 is diverted by the default valve 280 into fluid line 268, through ball check valve 286, and delivered to the solenoid 186 in order to provide control of the TCC 188. In addition, fluid flow from line 256 is diverted by the default valve 280 into fluid line 276, and through the ball check valve 288 to the solenoid 332A. Accordingly, to engage a fourth gear, solenoids 332A, 332C, 332E, and 332F are opened to engage actuators 330A, 330C, 330Ea and 330Eb. To engage a fifth gear, solenoids 332A, 332B, 332E, and 332F are opened to engage actuators 330A, 330B, 330Ea and 330Eb. To engage a sixth gear, solenoids 332A, 332B, and 332C are opened to engage actuators 330A, 330B, and 330C. To engage a seventh gear, solenoids 332A, 332B, and 332D are opened to engage actuators 330A, 330B, and 330D. To engage an eighth gear, solenoids 332A, 332C, and 332D are opened to engage actuators 330A, 330C, and 330D.

Figure 6A:
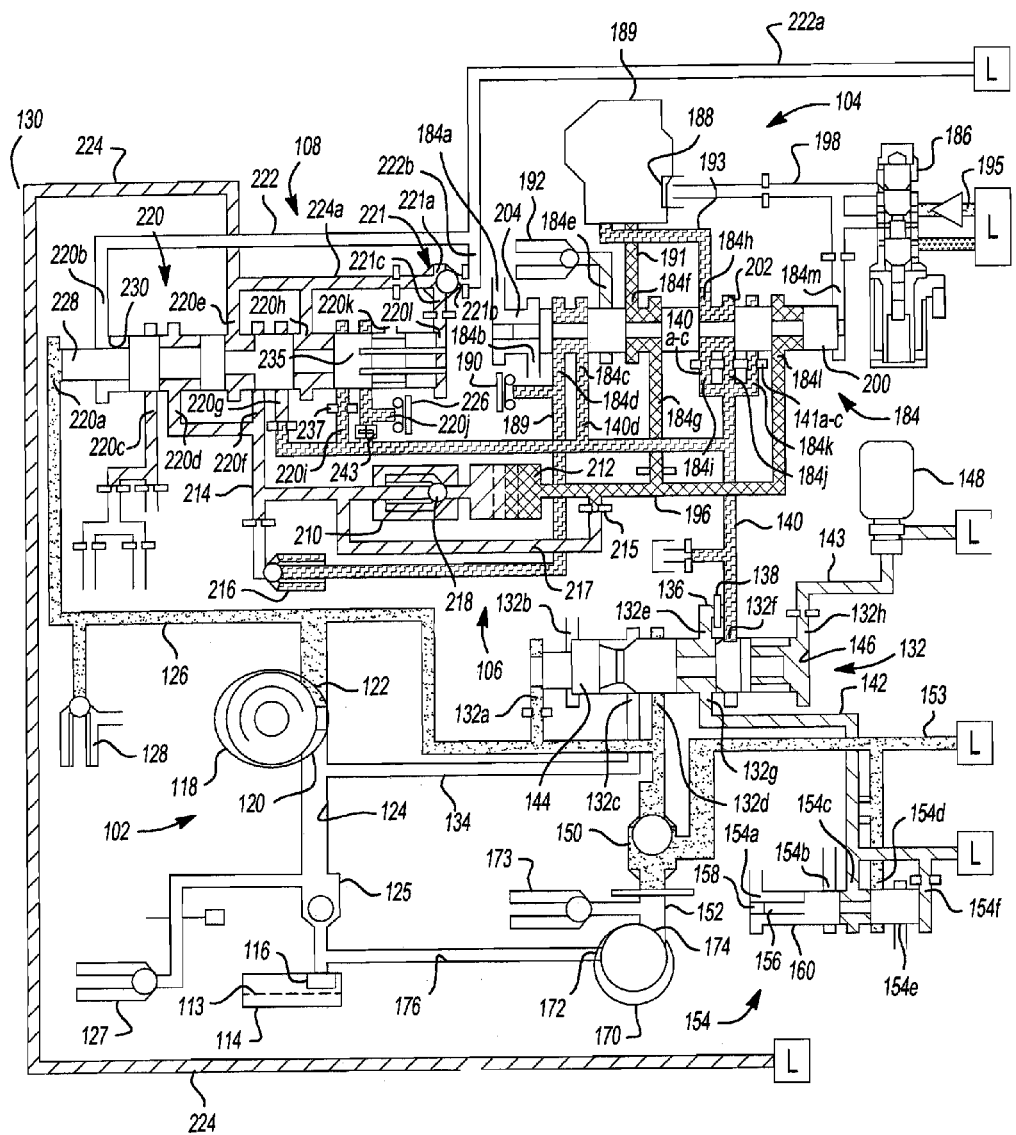
FIGS. 6A-6C is a diagram of a hydraulic control system according to the principles of the present invention in a Drive Sixth Gear Default state of operation.
Figure 6B:
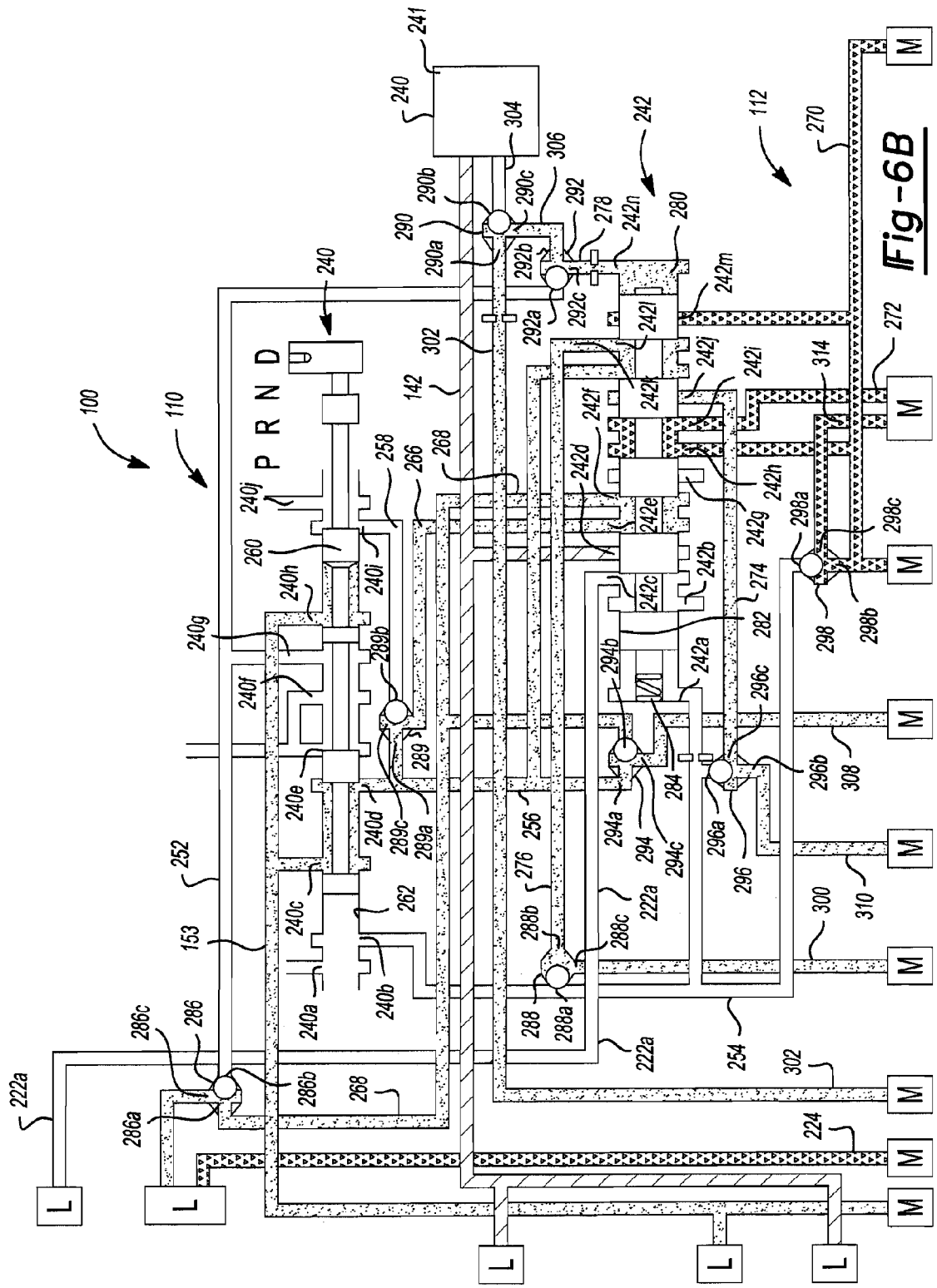
Figure 6C:
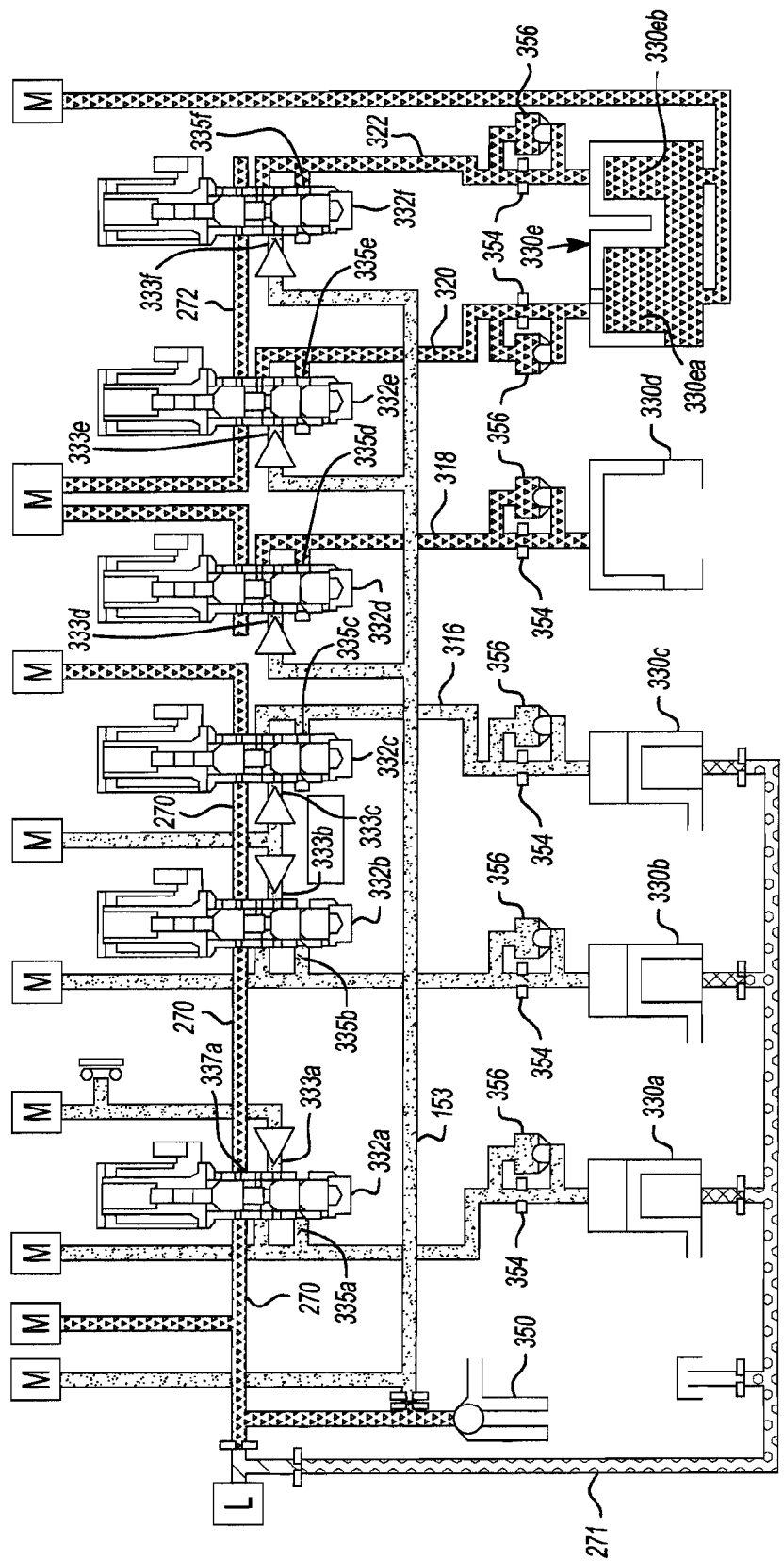

In the event of an electrical failure within the transmission when the motor vehicle is in one of the fourth, fifth, sixth, seventh, or eighth speed ratios, the hydraulic control system 100 enters a sixth gear Drive default state, shown in FIGS. 6A-6C. In this condition, solenoids 332A, 332B, and 332C default to an open state while solenoids 332D, 332E, and 332F default to a closed state. In addition, solenoid 241 reverts to a closed state, which would normally allow the default valve 280 to de-stroke, thereby cutting off hydraulic fluid flow to the TCC control solenoid 186 and the solenoid 332A, both critical for high speed ratio operations. However, since the solenoid 332A is configured to be engaged in all high speed ratios (i.e. speed ratios of fourth gear and higher), in the event of an electrical failure at a high speed ratio, hydraulic fluid at line pressure is already present in fluid line 302. Accordingly, during an electrical failure, as the solenoid 241 closes, ball check valve 290 shifts to close off the solenoid 241 and allow hydraulic fluid at line pressure to communicate via ball check valve 292 to the default valve 280, thereby keeping the default valve 280 in the stroked position and assuring pressurized hydraulic fluid reaches solenoid 186 and 332A. With solenoids 332A, 332B, and 332C open in the default condition, actuators 330A, 330B, and 330C are engaged, thereby providing the sixth gear and assuring that an electrical failure will not result in the motor vehicle not being drivable, even at high speeds.

While in the above description, certain actuators 330A-E have been described as necessary to engage certain speed or gear ratios, it should be appreciated that the actuators 330A-E may assigned to engage other gear ratios without departing from the scope of the present invention. In addition, it should be appreciated that the plurality of fluid communication lines described above may be integrated in a valve body or formed from separate tubing or piping without departing from the scope of the present invention. The fluid communication lines may have any cross sectional shape and may include additional or fewer bends, turns, and branches than illustrated without departing from the scope of the present invention. Finally, the fluid communication lines described above may be regarded as separate lines or single lines with multiple branches without departing from the scope of the present invention.

The description of the invention is merely exemplary in nature and variations that do not depart from the general essence of the invention are intended to be within the scope of the invention. Such variations are not to be regarded as a departure from the spirit and scope of the invention.

I claim the following:

1. A hydraulic control system for a transmission, the transmission having a plurality of torque transmitting devices selectively actuatable by a plurality of actuators for providing at least a set of low speed gear ratios and a set of high speed gear ratios, the hydraulic control system comprising:
    a source of pressurized hydraulic fluid;
    a manual valve moveable between at least a Park position and a Drive position, the manual valve in downstream fluid communication with the source of pressurized hydraulic fluid;
    a default valve moveable between a first position and a second position, the default valve in downstream fluid communication with the manual valve;
    a first set of solenoids operable to selectively engage at least one of the plurality of actuators, wherein the first set of solenoids is open when de-energized and includes a first subset of solenoids in downstream fluid communication with the source of pressurized hydraulic fluid through the manual valve when the manual valve is in the Drive position and a second subset of solenoids in downstream fluid communication with the default valve, and wherein at least the second subset of solenoids is configured to engage each of the plurality of high speed gear ratios and is in downstream fluid communication with the source of pressurized hydraulic fluid through the manual valve and the default valve when the manual valve is in the Drive position and the default valve is in the second position; and
    a second set of solenoids in downstream fluid communication with the source of pressurized hydraulic fluid and operable to selectively engage at least one of the plurality of actuators, wherein the second set of solenoids is closed when de-energized and includes a third subset of solenoids each having an inlet in downstream fluid communication with the source of pressurized hydraulic fluid, an outlet in fluid communication with at least one of the plurality of actuators, and an exhaust in fluid communication with the outlet when the third subset of solenoids is closed, and wherein the exhaust is in fluid communication with the first set of solenoids through the default valve when the default valve is in the first position, and
    wherein a default gear ratio within the low speed gear ratios is engaged when the manual valve is in the Drive position, the default valve is in the first position, and the first and second sets of solenoids are de-energized, and
    wherein a default gear ratio within the high speed gear ratios is engaged when the manual valve is in the Drive position, the default valve is in the second position, and the first and second set of solenoids are de-energized.

2. The hydraulic control system of claim 1 further comprising a valve solenoid in fluid communication with the default valve and operable to move the default valve to the second position, wherein the valve solenoid is closed when de-energized.

3. The hydraulic control system of claim 2 wherein the default valve is kept in the second position by hydraulic fluid provided by the second subset of solenoids when the valve solenoid, the first set of solenoids, and the second set of solenoids are de-energized.

4. The hydraulic control system of claim 1 wherein the first subset of solenoids includes two solenoids and the second subset of solenoids includes one solenoid.

5. The hydraulic control system of claim 1 wherein the second set of solenoids includes three solenoids and the third subset of solenoids includes two solenoids.

6. The hydraulic control system of claim 1 further comprising a torque converter clutch actuator and a torque converter clutch solenoid configured to selectively actuate the torque converter clutch actuator.

7. The hydraulic control system of claim 6 wherein the torque converter clutch solenoid is in downstream fluid communication with the source of pressurized hydraulic fluid through the default valve and the manual valve when the manual valve is in the Drive position and the default valve is in the second position.

8. The hydraulic control system of claim 6 further comprising a torque converter control valve in downstream fluid communication with the source of pressurized hydraulic fluid, a cooler subsystem in downstream fluid communication with the torque converter control valve, and a lubrication control valve in downstream fluid communication with the cooler subsystem and in fluid communication with a plurality of actuators that are controlled by the first set of solenoids, and wherein the cooler subsystem includes a cooler and a bypass line that bypasses the cooler.

9. The hydraulic control system of claim 8 wherein when the manual valve is in the Park position and the default valve is in the first position, the torque converter control valve communicates hydraulic fluid to a torque converter from the source of pressurized hydraulic fluid and the torque converter communicates the hydraulic fluid to the cooler subsystem through the torque converter control valve.

10. The hydraulic control system of claim 8 wherein when the manual valve is in the Park position and the default valve is in the second position, the torque converter control valve communicates hydraulic fluid to a torque converter from the source of pressurized hydraulic fluid and the default valve communicates hydraulic fluid to the first subset of solenoids to actuate the actuators, thereby forcing hydraulic fluid through the lubrication valve, through the bypass line, and through the torque converter control valve into the torque converter.

11. The hydraulic control system of claim 1 wherein the high speed gear ratios are engageable when the default valve is in the second position.

12. The hydraulic control system of claim 1 wherein the low speed gear ratios include a first gear, a second gear, and a third gear, and the default gear ratio within the low speed gear ratios is the third gear.

13. The hydraulic control system of claim 1 wherein the high speed gear ratios include a fourth gear, a fifth gear, a sixth gear, a seventh gear, and an eighth gear, and the default gear ratio within the low speed gear ratios is the sixth gear.

14. A hydraulic control system for a transmission, the transmission having a plurality of torque transmitting devices, the hydraulic control system comprising:
   a source of pressurized hydraulic fluid;
   a manual valve moveable between at least a Park position and a Drive position, the manual valve in downstream fluid communication with the source of pressurized hydraulic fluid;
   a default valve moveable between a first position and a second position, the default valve in downstream fluid communication with the manual valve;
   a plurality of actuators each configured to engage at least one of the plurality of torque transmitting devices, wherein selective engagement of the plurality of actuators provides at least a set of low speed gear ratios and a set of high speed gear ratios;
   a first solenoid configured to selectively engage at least one of the plurality of actuators required to engage each of the plurality of high speed gear ratios, wherein the first solenoid is open when de-energized and is in downstream fluid communication with the source of pressurized hydraulic fluid through the manual valve and the default valve when the manual valve is in the Drive position and the default valve is in the second position;
   a second solenoid configured to selectively engage at least one of the plurality of actuators, wherein the second solenoid is open when de-energized and is in downstream fluid communication with the source of pressurized hydraulic fluid through the manual valve when the manual valve is in the Drive position;
   a third solenoid configured to selectively engage at least one of the plurality of actuators, wherein the third solenoid is open when de-energized and is in downstream fluid communication with the source of pressurized hydraulic fluid through the manual valve when the manual valve is in the Drive position;
   a fourth solenoid configured to selectively engage at least one of the plurality of actuators, wherein the fourth solenoid is closed when de-energized and is in downstream fluid communication with the source of pressurized hydraulic fluid;
   a fifth solenoid configured to selectively engage at least one of the plurality of actuators, wherein the fifth solenoid is closed when de-energized and the fifth solenoid includes an inlet in downstream fluid communication with the source of pressurized hydraulic fluid, an outlet in fluid communication with at least one of the plurality of actuators, and an exhaust in fluid communication with the outlet when the fifth solenoid is closed, and wherein the exhaust is in fluid communication with the second solenoid through the default valve when the default valve is in the first position;
   a sixth solenoid configured to selectively engage at least one of the plurality of actuators, wherein the sixth solenoid is closed when de-energized and the sixth solenoid includes an inlet in downstream fluid communication with the source of pressurized hydraulic fluid, an outlet in fluid communication with at least one of the plurality of actuators, and an exhaust in fluid communication with the outlet when the sixth solenoid is closed, and wherein the exhaust is in fluid communication with the second solenoid through the default valve when the default valve is in the first position; and
   wherein a default gear ratio within the low speed gear ratios is engaged when the manual valve is in the Drive position, the default valve is in the first position, and the first, second, third, fourth, fifth, and sixth solenoids are de-energized, and
   wherein a default gear ratio within the high speed gear ratios is engaged when the manual valve is in the Drive position, the default valve is in the second position, and the first, second, third, fourth, fifth, and sixth solenoids are de-energized.

15. The hydraulic control system of claim 14 further comprising a valve solenoid in fluid communication with the default valve and operable to move the default valve to the second position, wherein the valve solenoid is closed when de-energized.

16. The hydraulic control system of claim 15 wherein the default valve is kept in the second position by hydraulic fluid from the first solenoid when the solenoids are de-energized.

17. The hydraulic control system of claim 14 further comprising a torque converter clutch actuator and a torque converter clutch solenoid configured to selectively actuate the torque converter clutch actuator.

18. The hydraulic control system of claim 17 wherein the torque converter clutch solenoid is in downstream fluid communication with the source of pressurized hydraulic fluid through the default valve and the manual valve when the manual valve is in the Drive position and the default valve is in the second position.

19. The hydraulic control system of claim 18 further comprising a torque converter control valve in downstream fluid communication with the source of pressurized hydraulic fluid, a cooler subsystem in downstream fluid communication with the torque converter control valve, and a lubrication control valve in downstream fluid communication with the cooler subsystem and in fluid communication with a plurality of actuators that are controlled by at least the second and third solenoids, and wherein the cooler subsystem includes a cooler and a bypass line that bypasses the cooler.

20. The hydraulic control system of claim 19 wherein when the manual valve is in the Park position and the default valve is in the first position, the torque converter control valve communicates hydraulic fluid to a torque converter from the source of pressurized hydraulic fluid and the torque converter communicates the hydraulic fluid to the cooler subsystem through the torque converter control valve.

21. The hydraulic control system of claim 19 wherein when the manual valve is in the Park position and the default valve is in the second position, the torque converter control valve communicates hydraulic fluid to a torque converter from the source of pressurized hydraulic fluid and the default valve communicates hydraulic fluid to the second and third solenoids to actuate the actuators, thereby forcing hydraulic fluid through the lubrication valve, through the bypass line, and through the torque converter control valve into the torque converter.

22. The hydraulic control system of claim 14 wherein the high speed gear ratios are engageable when the default valve is in the second position.

23. The hydraulic control system of claim 14 wherein the low speed gear ratios include a first gear, a second gear, and a third gear, and the default gear ratio within the low speed gear ratios is the third gear.

24. The hydraulic control system of claim 23 wherein the high speed gear ratios include a fourth gear, a fifth gear, a sixth gear, a seventh gear, and an eighth gear, and the default gear ratio within the low speed gear ratios is the sixth gear.

* * * * *